US006956603B2

(12) United States Patent
Fujii

(10) Patent No.: US 6,956,603 B2
(45) Date of Patent: Oct. 18, 2005

(54) MOVING OBJECT DETECTING METHOD, APPARATUS AND COMPUTER PROGRAM PRODUCT

(75) Inventor: Hirofumi Fujii, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 630 days.

(21) Appl. No.: 10/201,442

(22) Filed: Jul. 23, 2002

(65) Prior Publication Data

US 2003/0025794 A1 Feb. 6, 2003

(30) Foreign Application Priority Data

Jul. 31, 2001 (JP) .............................. 2001-232667

(51) Int. Cl.$^7$ ............................................ H04N 7/18
(52) U.S. Cl. ..................................................... 348/169
(58) Field of Search .............................. 348/169, 170, 348/171, 172; 382/107

(56) References Cited

U.S. PATENT DOCUMENTS 6,303,920 B1 * 10/2001 Wixson ................... 250/208.1
6,628,805 B1 * 9/2003 Hansen et al. .............. 382/107

OTHER PUBLICATIONS

Yamane et al, "Person Tracking By Integrating Optical Flow and Uniform Brightness Regions", IEEE International Conference on Robotics and Automation, vol. 4, pp. 3267-3272, May 1998.*

Bors et al, "Prediction and Tracking of Moving Objects in Image Sequences", IEEE Transactions On Image Processing, vol. 9, No. 8, pp. 1441-1445, Aug. 2000.*

* cited by examiner

Primary Examiner—Vu Le
(74) Attorney, Agent, or Firm—Pearne & Gordon LLP

(57) ABSTRACT

Herein disclosed a moving object detecting method of detecting optical flow segments indicative of loci of one or more moving objects apparently moved in a moving picture sequence including a plurality of picture frames each indicating the one or more moving objects at a time point to ensure that the one or more moving objects are correctly detected, the picture frames including a first picture frame indicating the one or more moving objects at a first time point, a second picture frame indicating the one or more moving objects at a second time point, a third picture frame indicating the one or more moving objects at a third time point, and a fourth picture frame indicating the one or more moving objects at a fourth time point in late order, the method comprising the steps of: h) generating filtered optical flow segments indicative of loci of the one or more moving objects apparently moved in the moving picture sequence in the time interval starting from the third time point to the first time point; and i) adding the filtered optical flow segments generated in the step (h) to the first optical flow segments detected in the step (e) to generate integrated optical flow segments indicative of loci of the one or more moving objects apparently moved in the moving picture sequence in the time interval starting from the third time point to the first time point.

25 Claims, 11 Drawing Sheets

F I G. 9
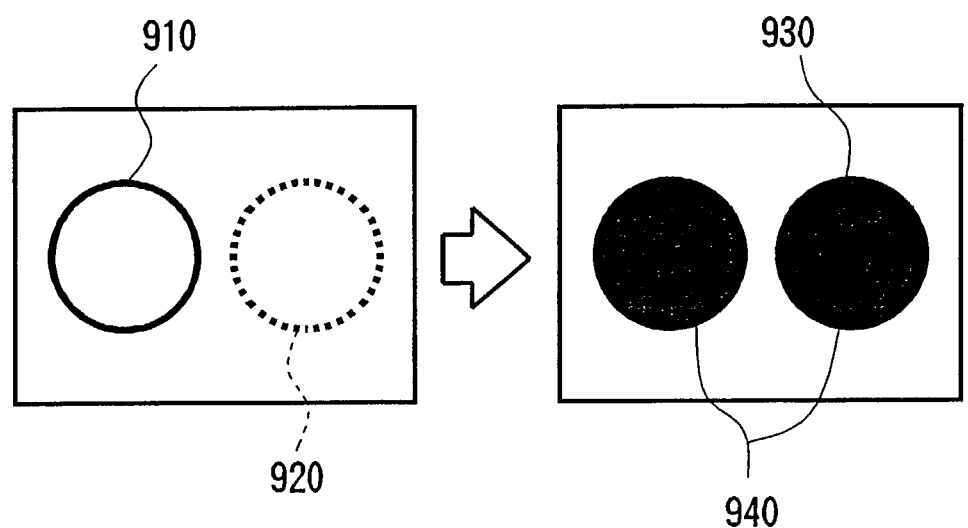

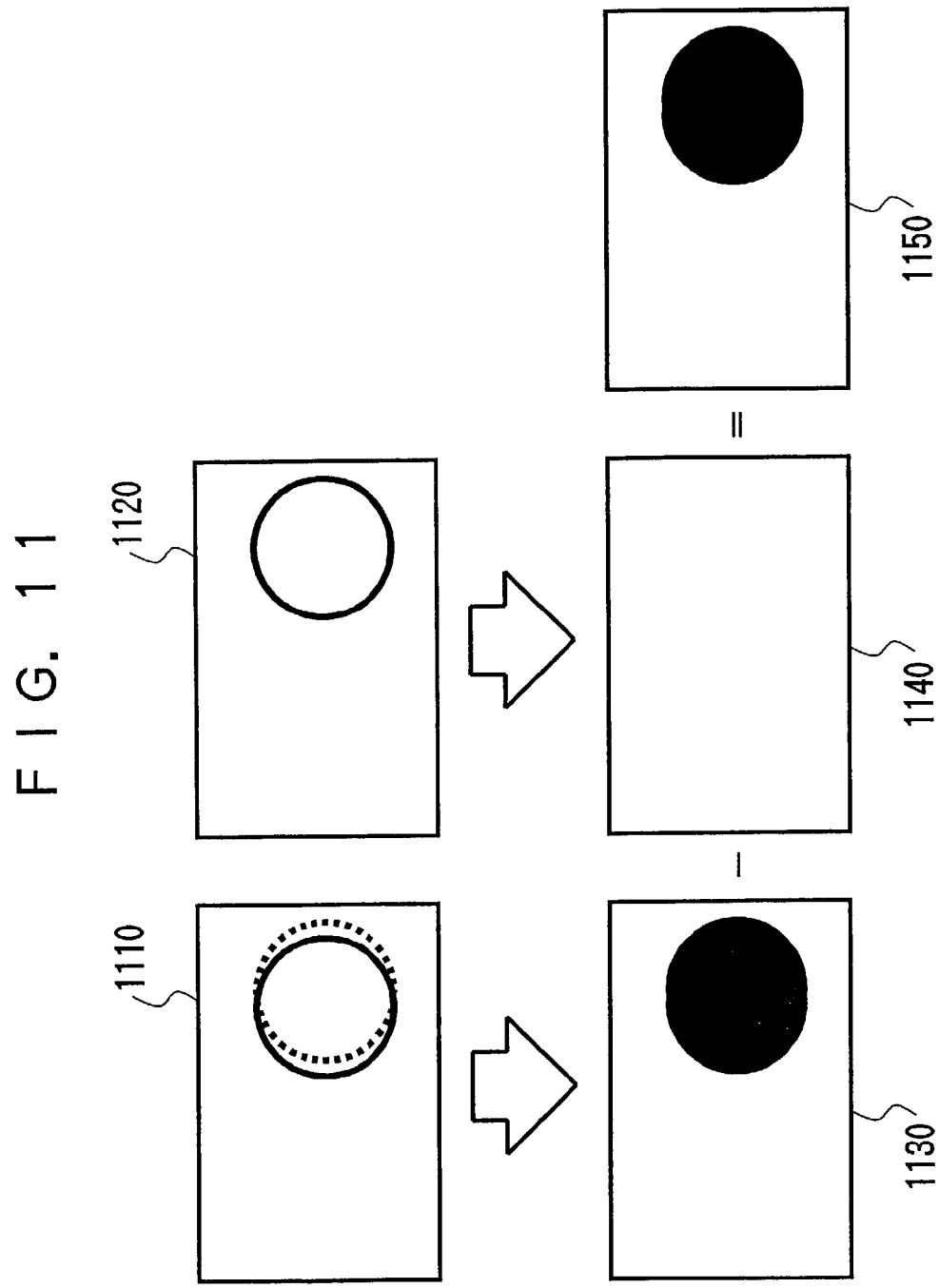

MOVING OBJECT DETECTING METHOD, APPARATUS AND COMPUTER PROGRAM PRODUCT

BACKGROUND OF THE INVENTION

1. Technical Field of the Invention

The present invention relates to a moving object detecting method of, a moving object detecting apparatus for, and a moving object detecting computer program product for detecting optical flow segments indicative of loci of one or more moving objects apparently moved in a moving picture sequence including a plurality of picture frames each indicating the one or more moving objects at a time point to ensure that the moving objects are correctly detected

2. Description of the Related Art

Up until now, there have been proposed a wide variety of moving object detecting methods of detecting optical flow segments indicative of apparent motion, i.e., loci of one or more moving objects apparently moved in a moving picture sequence such as, for example but not limited to, motion video pictures, including a plurality of picture frames each indicating the one or more moving objects at a time point to ensure that the moving objects are detected.

The optical flow segments are intended to mean the apparent motion, i.e., loci of a moving object in the moving picture sequence including a plurality of picture frames each indicating the moving object at a time point as shown in FIG. 8. A moving object 810 is indicated by, for example, a current picture frame forming part of the moving picture sequence at a current time point. A moving object 820 is indicated by a past picture frame forming part of the moving picture sequence at a past time point earlier than the current time point. There may be provided a plurality of picture frames between the past picture frame and the current picture frame in a time interval starting from the past time point to the current time point. The term "current picture frame" and "current time point" as used herein are respectively intended to mean a picture frame later than the past picture frame and a time point later than the past time point, but not limited to the present picture frame or the present time point in the literal sense of the words. Optical flow segments 830 indicate the apparent motion of the moving object, i.e., the loci of the moving object apparently moved in the moving picture sequence in the time interval starting from the past time point to the current time point. Here, the logical addition of an area in which the moving object 810 occupies in the current picture frame and an area in which the moving object 820 occupies in the past picture frame will be hereinlater referred to as "an optical flow generating area 840".

The optical flow segments are typically detected and generated through the operations of: (A) dividing the current picture frame into a plurality of blocks each containing at least one picture element; (B) dividing the past picture frame into a plurality of blocks each containing at least one picture element; (D) sequentially comparing each of the blocks of the past picture frame with blocks of the current picture frame to select a block of the current picture frame apparently placed in the vicinity of the block of the past picture frame and having the highest degree of similarity with the block of the past picture frame from among the blocks of the current picture frame apparently placed in the vicinity of the block of the past picture frame; and (D) detecting and generating optical flow segments each starting from a block of the past picture frame to a block of the current picture frame apparently placed in the vicinity of the block of the past picture frame and having the highest degree of similarity with the block of the past picture frame from among the blocks of the current picture frame apparently placed in the vicinity of the block of the past picture frame. The degree of similarity may be assessed on the basis of, for example but not limited to, mean absolute differences (MAD), root mean square differences (RMSD), or correlation values.

The aforesaid operations, however, require a large amount of computational processes and time. This leads to the fact that the aforesaid operations are generally performed only in blocks of the current picture frame apparently placed in the vicinity of a block of the past picture frames by, for example but not limited to, a predetermined number of blocks or less, for example, a couple of blocks or less to detect and generate optical flow segments. This means that the operations (C) and (D) are performed through the operations of sequentially comparing each of the blocks of the past picture frame with the blocks of the current picture frame to select a block of the current picture frame apparently placed in the vicinity of the block of the past picture frame and having the highest degree of similarity with the block of the past picture frame from among the blocks of the current picture frame apparently placed in the vicinity of the block of the past picture frame by a predetermined number of blocks or less; and detecting and generating optical flow segments each starting from a block of the past picture frame to a block of the current picture frame apparently placed in the vicinity of the block of the past picture frame and having the highest degree of similarity with the block of the past picture frame from among the blocks of a detectable area, i.e., the blocks of the current picture frame apparently placed in the vicinity of the block of the past picture frame by a predetermined number of blocks or less.

A part of a moving object apparently moved to, for instance, an undetectable area away from the detectable area, i.e., the blocks of the current picture frame apparently placed in the vicinity of the blocks of the past picture frame indicative of the part of the moving object at the past time point by more than the predetermined number of blocks, the aforesaid operations may inaccurately detect and generate optical flow segments each starting from a block of the past picture frame indicative of the part of the moving object at the past time point to a block of the current picture frame apparently placed in the vicinity of the block of the past picture frame and having the highest degree of similarity with the block of the past picture frame among the blocks of the current picture frame apparently placed in the vicinity of the block of the past picture frame by a predetermined number of blocks or less, which is not indicative of the part of the moving object.

This leads to the fact that the aforesaid operations are required to shorten the time interval starting from a past time point to a current time point to detect and generate optical flow segments indicative of apparent motion of a moving object moving at a high moving speed so that the moving object apparently moved in the moving picture sequence would remain in the detectable area, i.e., the blocks of the current picture frame at the current time point apparently placed in the vicinity of the block of the past picture frame at the past time point by a predetermined number of blocks or less while, on the other hand, the aforesaid operations are required to lengthen the time interval starting from a past time point to a current time point to detect and generate optical flow segments indicative of apparent motion of a moving object moving at a low moving speed so that the optical flow segments indicative of the apparent motion of the moving object apparently moved in the time interval would be detected and generated.

One typical type of the conventional moving object detecting method is disclosed in Japanese Patent Application Laid-Open Publication No. 16776/1997. In order to meet the above requirements of adaptively changing the time interval in accordance with the moving speed of the moving object, the aforesaid conventional moving object detecting method comprises the steps of: (a) inputting a current picture frame indicating a moving object at a current time point; (b) inputting a past picture frame indicating the moving object at a past time point; (c) detecting and generating optical flow segments indicative of apparent motion, i.e., loci of the moving object apparently moved from the past time point to the current time point; (d) evaluating the degree of validity of the optical flow segments thus detected and generated; and (e) controlling the time interval starting from the past time point to the current time point on the basis of the result of evaluation made in the step (d).

The aforesaid conventional moving object detecting method, however, encounters a drawback that the aforesaid conventional moving object detecting method can detect and generate optical flow segments indicative of loci of a moving object moved at a constant moving speed while, on the other hand, the aforesaid conventional moving object detecting method cannot accurately detect and generate optical flow segments indicative of loci of a plurality of moving objects apparently moved at variable moving speeds.

Furthermore, the aforesaid conventional moving object detecting method encounters another drawback that the conventional moving object detecting method may generate false optical flow segments which inaccurately indicate the apparent motion, i.e., loci of a moving object apparently moved at a moving speed so high with respect to the time interval starting from a past time point to a current time point that the moving object apparently moved away from a detectable area in which optical flow segments can be properly detected and generated, to an undetectable area of the current picture frame apparently placed in the vicinity of the blocks of the past picture frame indicative of the moving object at the past time point by more than the predetermined number of blocks, resulting in the fact that the aforesaid conventional moving object detecting method may inaccurately detect and generate optical flow segments each starting from a block of the past picture frame indicative of a part of the moving object to a block of the current picture frame apparently placed in the vicinity of the block of the past picture frame and having the highest degree of similarity with the block of the past picture frame among the blocks of the current picture frame apparently placed in the vicinity of the block of the past picture frame by a predetermined number of blocks or less, which is not indicative of any part of the moving object as shown in FIG. 9. In FIG. 9, a moving object 910 indicated by, for example, a current picture frame is apparently moved from a moving object 920 indicated by a past picture frame earlier than the current picture frame. The logical addition of an area in which the moving object 910 occupies in the current picture frame and an area in which the moving object 920 occupies in the past picture frame is an optical flow generating area 940. Assuming that the moving object 910 is placed in an undetectable area in which optical flow segments cannot be properly detected and generated, the optical flow generating area 940 may contain an area in which false optical flow segments may be detected and generated, which will be hereinlater referred to as "false optical flow generating area 930" in which false optical flow segments inaccurately indicating loci of a moving object are detected and generated.

The present invention is made with a view to overcoming the previously mentioned drawbacks inherent to the conventional moving object detecting method and the conventional moving object detecting apparatus.

SUMMARY OF THE INVENTION

It is therefore an object of the present invention to provide a moving object detecting method which can detect optical flow segments indicative of loci of one or more moving objects apparently moved at variable moving speeds in a moving picture sequence including a plurality of picture frames each indicating the one or more moving objects at a time point to ensure that the moving objects are correctly detected.

It is another object of the present invention to provide a moving object detecting method which can accurately detect optical flow segments indicative of loci of one or more moving objects apparently moved at variable moving speeds in a moving picture sequence including a plurality of picture frames each indicating the one or more moving objects at a time point by eliminating false optical flow segments which inaccurately indicate loci of a moving object apparently moved at a moving speed so high that the moving object apparently moved to an undetectable area away from a detectable area in which optical flow segments can be properly detected and generated to ensure that the moving objects are correctly detected.

It is a further object of the present invention to provide a moving object detecting apparatus which can detect optical flow segments indicative of loci of one or more moving objects apparently moved at variable moving speeds in a moving picture sequence including a plurality of picture frames each indicating the one or more moving objects at a time point to ensure that the moving objects are correctly detected.

It is a still further object of the present invention to provide a moving object detecting apparatus which can accurately detect optical flow segments indicative of loci of one or more moving objects apparently moved at variable moving speeds in a moving picture sequence including a plurality of picture frames each indicating the one or more moving objects at a time point by eliminating false optical flow segments which inaccurately indicate loci of a moving object apparently moved at a moving speed so high that the moving object apparently moved to an undetectable area away from the detectable area in which optical flow segments can be properly detected and generated to ensure that the moving objects are correctly detected.

It is a yet further object of the present invention to provide a moving object detecting computer program product which can detect optical flow segments indicative of loci of one or more moving objects apparently moved at variable moving speeds in a moving picture sequence including a plurality of picture frames each indicating the one or more moving objects at a time point to ensure that the moving objects are correctly detected.

It is a yet further object of the present invention to provide a moving object detecting computer program product which can accurately detect optical flow segments indicative of loci of one or more moving objects apparently moved at variable moving speeds in a moving picture sequence including a plurality of picture frames each indicating the one or more moving objects at a time point by eliminating false optical flow segments which inaccurately indicate loci of a moving object apparently moved at a moving speed so high that the moving object apparently moved to an undetectable area away from the detectable area in which optical flow segments can be properly detected and generated to ensure that the moving objects are correctly detected.

In accordance with a first aspect of the present invention, there is provides a moving object detecting method of detecting optical flow segments indicative of loci of one or more moving objects apparently moved in a moving picture sequence including a plurality of picture frames each indicating the one or more moving objects at a time point to ensure that the one or more moving objects are correctly detected, the picture frames including a first picture frame indicating the one or more moving objects at a first time point, a second picture frame indicating the one or more moving objects at a second time point, a third picture frame indicating the one or more moving objects at a third time point, and a fourth picture frame indicating the one or more moving objects at a fourth time point in late order, the method comprising the steps of: a) inputting the first picture frame; b) inputting the second picture frame; c) inputting the third picture frame; d) inputting the fourth picture frame; e) detecting first optical flow segments indicative of loci of the one or more moving objects apparently moved in the moving picture sequence in a time interval starting from the second time point to the first time point on the basis of the first picture frame inputted in the step (a) and the second picture frame inputted in the step (b); f) detecting second optical flow segments indicative of loci of the one or more moving objects apparently moved in the moving picture sequence in a time interval starting from the third time point to the first time point on the basis of the first picture frame inputted in the step (a) and the third picture frame inputted in the step (c); g) detecting third optical flow segments indicative of loci of the one or more moving objects apparently moved in the moving picture sequence in a time interval starting from the fourth time point to the third time point on the basis of the third picture frame inputted in the step (c) and the fourth picture frame inputted in the step (d); h) subtracting the third optical flow segments detected in the step (g) from the second optical flow segments detected in the step (f) to generate filtered optical flow segments indicative of loci of the one or more moving objects apparently moved in the moving picture sequence in the time interval starting from the third time point to the first time point; and i) adding the filtered optical flow segments generated in the step (h) to the first optical flow segments detected in the step (e) to generate integrated optical flow segments indicative of loci of the one or more moving objects apparently moved in the moving picture sequence in the time interval starting from the third time point to the first time point.

In the aforesaid step (e) may have the steps of: (e1) dividing the first picture frame inputted in the step (a) into a plurality of blocks each containing at least one picture element; (e2) dividing the second picture frame inputted in the step (b) into a plurality of blocks each containing at least one picture element; (e3) sequentially comparing each of the blocks of the second picture frame divided in the step (e2) with blocks of the first picture frame divided in the step (e1) to select a block of the first picture frame apparently placed in the vicinity of the block of the second picture frame and having the highest degree of similarity with the block of the second picture frame from among the blocks of the first picture frame apparently placed in the vicinity of the block of the second picture frame; and (e4) detecting optical flow segments each starting from a block of the second picture frame divided in the step (e2) to a block of the first picture frame selected in the step (e3) apparently placed in the vicinity of the block of the second picture frame and having the highest degree of similarity with the block of the second picture frame from among the blocks of the first picture frame apparently placed in the vicinity of the block of the second picture frame.

In accordance with a second aspect of the present invention, there is provided a moving object detecting method may further comprising the steps of: j) detecting neighboring areas neighboring to optical flow generating areas in which the integrated optical flow segments are detected in the step (i) to obtain neighboring area information; k) estimating moving object candidate areas in the moving picture sequence in which the moving objects are supposed to be present on the basis of the neighboring area information detected in the step (j) to obtain moving object candidate area information in the moving picture sequence; and l) detecting the moving objects on the basis of the moving object candidate area information obtained in the step (k). The aforesaid moving object candidate area information may include information about the sizes, shapes, positions, picture elements, optical flow information of the moving object candidate areas. Alternatively, the aforesaid moving object detecting method may comprise the steps of: a2) inputting the first picture frame; b2) inputting the second picture frame; c2) inputting the third picture frame; d2) inputting the fourth picture frame; a3) storing the first picture frame; b3) storing the second picture frame; c3) storing the third picture frame; d3) storing the fourth picture frame; e1) detecting first optical flow segments indicative of loci of the one or more moving objects apparently moved in the moving picture sequence in a time interval starting from the second time point to the first time point on the basis of the first picture frame stored in the step (a2) and the second picture frame stored in the step (b2); f) detecting second optical flow segments indicative of loci of the one or more moving objects apparently moved in the moving picture sequence in a time interval starting from the third time point to the first time point on the basis of the first picture frame stored in the step (a2) and the third picture frame stored in the step (c2); g) detecting third optical flow segments indicative of loci of the one or more moving objects apparently moved in the moving picture sequence in a time interval starting from the fourth time point to the third time point on the basis of the third picture frame stored in the step (c2) and the fourth picture frame stored in the step (d2); h) subtracting the third optical flow segments detected in the step (g) from the second optical flow segments detected in the step (f) to generate filtered optical flow segments indicative of loci of the one or more moving objects apparently moved in the moving picture sequence in the time interval starting from the third time point to the first time point; i) adding the filtered optical flow segments generated in the step (h) to the first optical flow segments detected in the step (e) to generate integrated optical flow segments indicative of loci of the one or more moving objects apparently moved in the moving picture sequence in the time interval starting from the third time point to the first time point; j) detecting neighboring areas neighboring to optical flow generating areas in which the integrated optical flow segments are detected in the step (i) to obtain neighboring area information in the moving picture sequence; k) estimating moving object candidate areas in the moving picture sequence in which the moving objects are supposed to be present on the basis of the neighboring area information detected in the step (j) to obtain moving object candidate area information in the moving picture sequence; and l) detecting the moving objects in the moving picture sequence on the basis of the moving object candidate area information obtained in the step (k). The aforesaid moving object detecting method may further comprise the steps of: m) repeating the steps (a2) to (l), and tracking the moving objects in the moving picture sequence detected in the step (l) on the basis of the moving object candidate area information in the moving picture sequence accumulatively obtained in the step (k) to estimate moving object information including the number of the moving objects and the amount of apparent motion made by the moving objects; and n) controlling the time interval between the first time point and the second time point, the time interval between the second time point and the third time point, and the time interval between the third time point and the fourth time point, and the number of the integrated optical flow segments on the basis of the moving object information estimated in the step (m).

In accordance with a third aspect of the present invention, there is provided a moving object detecting apparatus for detecting optical flow segments indicative of loci of one or more moving objects apparently moved in a moving picture sequence including a plurality of picture frames each indicating the one or more moving objects at a time point to ensure that the one or more moving objects are correctly detected, the picture frames including a first picture frame indicating the one or more moving objects at a first time point, a second picture frame indicating the one or more moving objects at a second time point, a third picture frame indicating the one or more moving objects at a third time point, and a fourth picture frame indicating the one or more moving objects at a fourth time point in late order, the moving object detecting apparatus comprising: a picture inputting section for inputting the moving picture sequence including the first picture frame, the second picture frame, the third picture frame, and the fourth picture frame; a picture storage section for storing the moving picture sequence including the first picture frame, the second picture frame, the third picture frame, and the fourth picture frame inputted by the picture inputting section; and an optical flow detecting section for detecting integrated optical flow segments on the basis of the first picture frame inputted by the picture inputting section and the second picture frame, the third picture frame, and the fourth picture frame stored in the picture storage section.

The aforesaid optical flow detecting section may includes: a first optical flow detecting portion for detecting first optical flow segments indicative of loci of the one or more moving objects apparently moved in the moving picture sequence in a time interval starting from the second time point to the first time point on the basis of the first picture frame inputted by the picture inputting section and the second picture frame stored in the picture storage section; a second optical flow detecting portion for detecting second optical flow segments indicative of loci of the one or more moving objects apparently moved in the moving picture sequence in a time interval starting from the third time point to the first time point on the basis of the first picture frame inputted by the picture inputting section and the third picture frame stored in the picture storage section; a false optical flow detecting portion for detecting third optical flow segments indicative of loci of the one or more moving objects apparently moved in the moving picture sequence in a time interval starting from the fourth time point to the third time point on the basis of the third picture frame stored in the picture storage section and the fourth picture frame stored in the picture storage section; an optical flow subtracting portion for subtracting the third optical flow segments detected by the false optical flow detecting portion from the second optical flow segments detected by the second optical flow detecting portion to generate filtered optical flow segments indicative of loci of the one or more moving objects apparently moved in the moving picture sequence in the time interval starting from the third time point to the first time point; and an optical flow adding portion for adding the filtered optical flow segments generated by the optical flow subtracting portion to the first optical flow segments detected by the first optical flow detecting portion to generate integrated optical flow segments indicative of loci of the one or more moving objects apparently moved in the moving picture sequence in the time interval starting from the third time point to the first time point.

Alternatively, the aforesaid moving object detecting apparatus may further comprising an infrared camera unit for outputting a moving picture sequence of a heat distribution picture sequence including a plurality of picture frames including a first picture frame indicating the one or more moving objects at a first time point, a second picture frame indicating the one or more moving objects at a second time point, a third picture frame indicating the one or more moving objects at a third time point, and a fourth picture frame indicating the one or more moving objects at a fourth time point in late order. The picture inputting section may be replaced with a heat distribution picture inputting section for inputting the first picture frame, the second picture frame, the third frame picture, and the fourth frame picture forming part of the moving picture sequence of a heat distribution picture sequence outputted by the infrared camera unit; and the picture storage section may be replaced with a heat distribution picture storage section for storing the first picture frame, the second picture frame, the third frame picture, and the fourth frame picture forming part of the moving picture sequence of a heat distribution picture sequence inputted by the heat distribution picture inputting section.

In accordance with a fourth aspect of the present invention, there is provided a moving object detecting program product comprising a computer usable storage medium having computer readable code encoded herein for detecting optical flow segments indicative of loci of one or more moving objects apparently moved in a moving picture sequence including a plurality of picture frames each indicating the one or more moving objects at a time point to ensure that the one or more moving objects are correctly detected, the picture frames including a first picture frame indicating the one or more moving objects at a first time point, a second picture frame indicating the one or more moving objects at a second time point, a third picture frame indicating the one or more moving objects at a third time point, and a fourth picture frame indicating the one or more moving objects at a fourth time point in late order, the computer program product comprising: (a) computer readable program code for inputting the first picture frame; (b) computer readable program code for inputting the second picture frame; (c) computer readable program code for inputting the third picture frame; (d) computer readable program code for inputting the fourth picture frame; (e) computer readable program code for detecting first optical flow segments indicative of loci of the one or more moving objects apparently moved in the moving picture sequence in a time interval starting from the second time point to the first time point on the basis of the first picture frame inputted by the computer readable program code (a) and the second picture frame inputted by the computer readable program code (b); (f) computer readable program code for detecting second optical flow segments indicative of loci of the one or more moving objects apparently moved in the moving picture sequence in a time interval starting from the third time point to the first time point on the basis of the first picture frame inputted by the computer readable program code (a) and the third picture frame inputted by the computer readable program code (c); (g) detecting third optical flow segments indicative of loci of the one or more moving objects apparently moved in the moving picture sequence in a time interval starting from the fourth time point to the third time point on the basis of the third picture frame inputted by the computer readable program code (c) and the fourth picture frame inputted by the computer readable program code (d); (h) computer readable program code for subtracting the third optical flow segments detected by the computer readable program code (g) from the second optical flow segments detected by the computer readable program code (f) to generate filtered optical flow segments indicative of loci of the one or more moving objects apparently moved in the moving picture sequence in the time interval starting from the third time point to the first time point; and (i) computer readable program code for adding the filtered optical flow segments generated by the computer readable program code (h) to the first optical flow segments detected by the computer readable program code (e) to generate integrated optical flow segments indicative of loci of the one or more moving objects apparently moved in the moving picture sequence in the time interval starting from the third time point to the first time point.

BRIEF DESCRIPTION OF THE DRAWINGS

The objects, features and advantages of the present invention will become apparent as the description proceeds when taken in conjunction with the accompanying drawings, in which:

FIG. 9 is a schematic diagram explaining false optical flow segments which inaccurately indicate loci of a moving object apparently moved at an excessively high moving speed with respect to the time interval starting from a past time point to a current time point;

FIG. 11 is a schematic diagram explaining the processes of eliminating the false optical flow segments.

DESCRIPTION OF THE PREFERRED EMBODIMENTS

Figure 1:
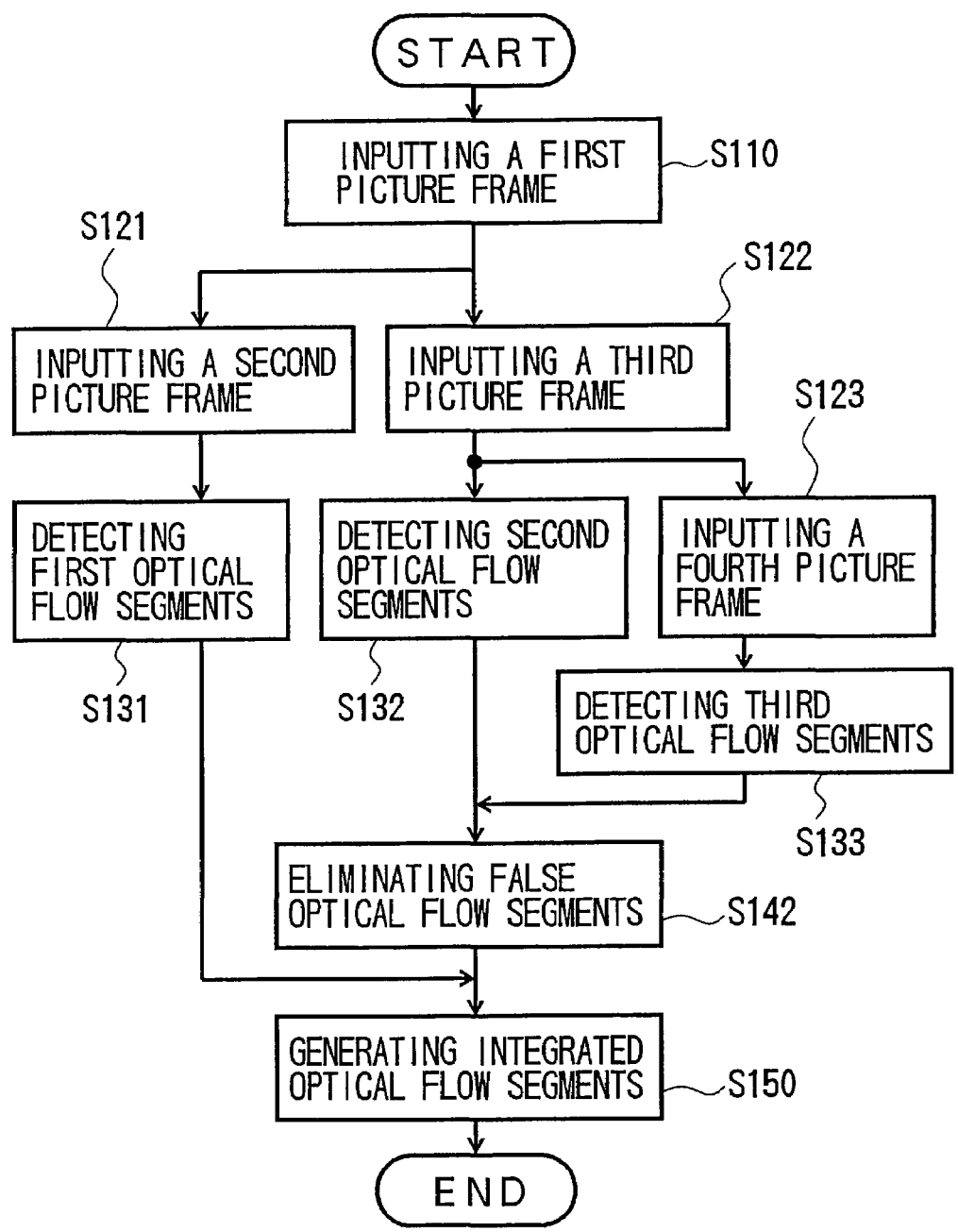
FIG. 1 is a flowchart showing a first embodiment of the moving object detecting method according to the present invention.

The preferred embodiments of the moving object detecting method and the moving object detecting apparatus will be described with reference to FIGS. 1 to 11. Throughout the following detailed description, similar reference characters and numbers refer to similar elements in all figures of the drawings.

Figure 2:
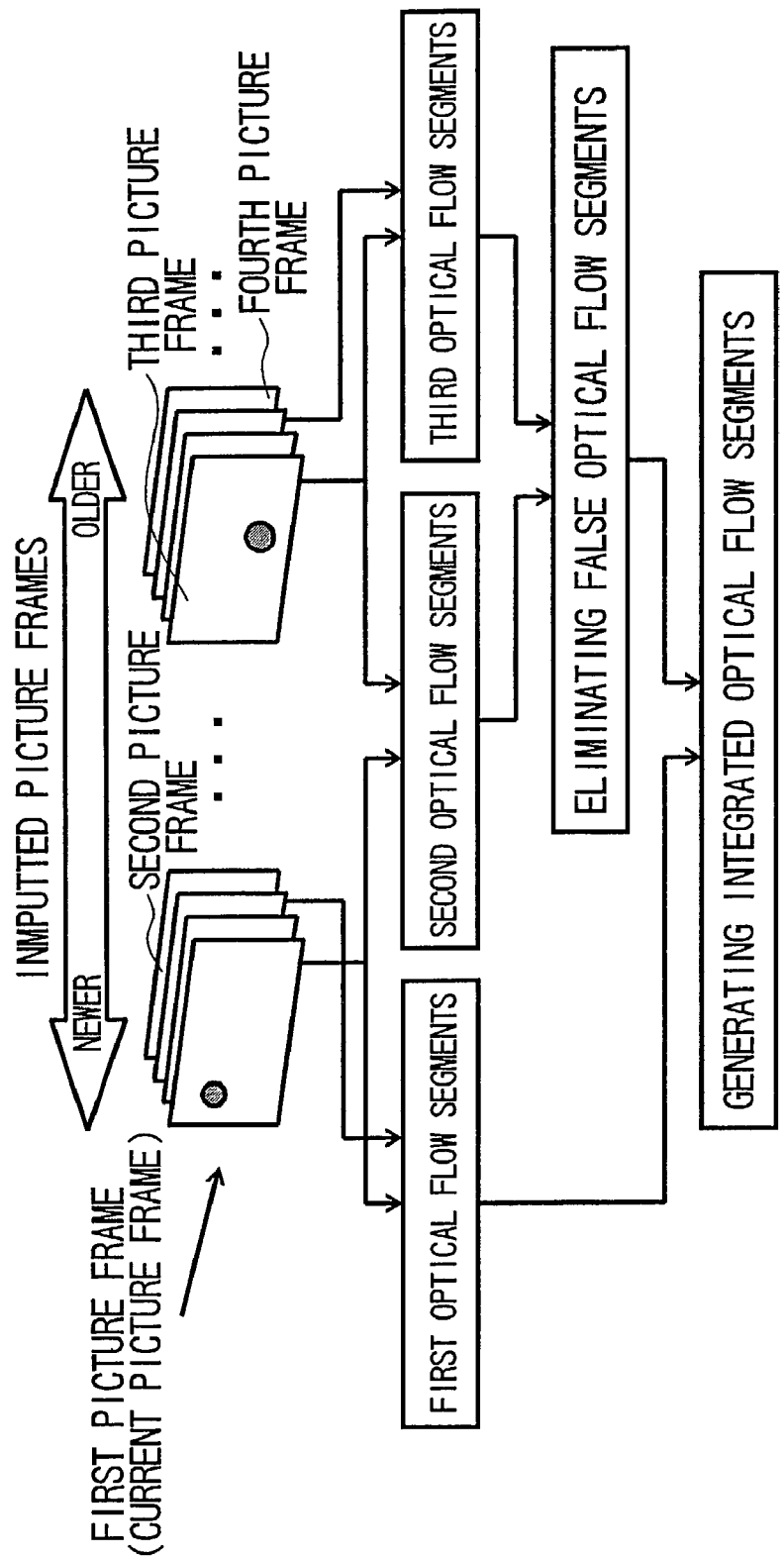
FIG. 2 is a schematic diagram explaining the processes performed by the first embodiment of the moving object detecting method shown in FIG. 1.

Referring now to the drawings, in particular FIGS. 1 and 2, there is shown a first preferred embodiment of the moving object detecting method according to the present invention of detecting optical flow segments indicative of loci of one or more moving objects apparently moved in a moving picture sequence including a plurality of picture frames to ensure that the one or more moving objects are correctly detected. The moving picture sequence may be, for example but not limited to, a motion video picture, and include a plurality of picture frames each indicating the one or more moving objects at a time point. The picture frames include a first picture frame indicating the one or more moving objects at a first time point, a second picture frame indicating the one or more moving objects at a second time point, a third picture frame indicating the one or more moving objects at a third time point, and a fourth picture frame indicating the one or more moving objects at a fourth time point in late order as shown in FIG. 2. This means that the fourth picture frame is older than the third picture frame. The third picture frame is older than the second picture frame. The second picture frame is older than the first picture frame. The first picture frame may be, for example but not limited to a current picture frame. There may be provided a plurality of picture frames between the first picture frame and the second picture frame in a time interval starting from the first time point to the second time point. There may be provided a plurality of picture frames between the second picture frame and the third picture frame in a time interval starting from the second time point to the third time point. There may be provided a plurality of picture frames between the third picture frame and the fourth picture frame in a time interval starting from the third time point to the fourth time point.

Figure 8A:
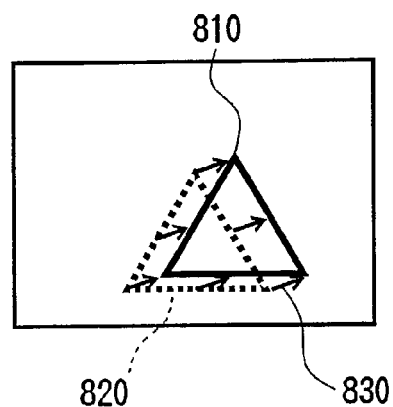
FIGS. 8A and 8B are a set of schematic diagrams briefly explaining the outline of optical flow segments.
Figure 8B:
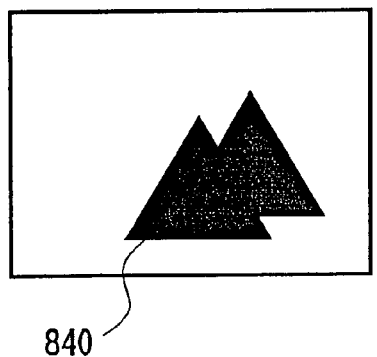

The optical flow segments are intended to mean the apparent motion, i.e., loci of a moving object in the moving picture sequence including a plurality of picture frames each indicating the moving object at a time point as shown in FIG. 8. A moving object 810 is indicated by a first picture frame, for example, a current picture frame forming part of the moving picture sequence at a first time point, for example, a current time point. A moving object 820 is indicated by a second picture frame forming part of the moving picture sequence at a second time point later than the first time point. There may be provided a plurality of picture frames between the second picture frame and the first picture frame in a time interval starting from the second time point to the first time point. Optical flow segments 830 indicate the apparent motion of the moving object, i.e., the loci of the moving object apparently moved in the moving picture sequence in the time interval starting from the second time point to the first time point. Here, a logical addition of an area in which the moving object 810 occupies in the current picture frame and an area in which the moving object 820 occupies in the past picture frame will be hereinlater referred to as "an optical flow generating area 840".

The flowchart of the first embodiment of the moving object detecting method of detecting optical flow segments indicative of loci of one or more moving objects apparently moved in a moving picture sequence including a plurality of picture frames each indicating the one or more moving objects at a time point to ensure that the one or more moving objects are correctly detected is shown in FIG. 1. The first embodiment of the moving object detecting method according to the present invention will be described with reference to FIG. 1.

In the step S110, the first picture frame is inputted. The step S110 goes forward to the step S121, in which the second picture frame is inputted. The step S121 goes forward to the step S131, in which first optical flow segments indicative of loci of the one or more moving objects apparently moved in the moving picture sequence in a time interval starting from the second time point to the first time point is detected on the basis of the first picture frame inputted in the step S110 and the second picture frame inputted in the step S121.

The optical flow segments are typically detected through the operations of:

(e1) dividing the first picture frame inputted in the step S110 into a plurality of blocks each containing at least one picture element;

(e2) dividing the second picture frame inputted in the step S121 into a plurality of blocks each containing at least one picture element;

(e3) sequentially comparing each of the blocks of the second picture frame divided in the step (e2) with blocks of the first picture frame divided in the step S121 to select a block of the first picture frame apparently placed in the vicinity of the block of the second picture frame and having the highest degree of similarity with the block of the second picture frame from among the blocks of the first picture frame apparently placed in the vicinity of the block of the second picture frame; and (e4) detecting optical flow segments each starting from a block of the second picture frame divided in the step (e2) to a block of the first picture frame selected in the step (e3) apparently placed in the vicinity of the block of the second picture frame and having the highest degree of similarity with the block of the second picture frame from among the blocks of the first picture frame apparently placed in the vicinity of the block of the second picture frame.

The degree of similarity may be assessed on the basis of, for example but not limited to, mean absolute differences (MAD), root mean square differences (RMSD), or correlation values.

In the step S122, the second picture frame is inputted. The step S122 goes forward to the step S132, in which second optical flow segments indicative of loci of the one or more moving objects apparently moved in the moving picture sequence in a time interval starting from the third time point to the first time point is detected on the basis of the first picture frame inputted in the step S110 and the third picture frame inputted in the step S122 in a similar manner as described above.

The time interval starting from the second time point to the first time point is shorter than the time interval starting from the third time point to the first time point. This means that the first optical flow segments detected in the step S131 indicate loci of the one or more moving objects apparently moved at a high moving speed in the moving picture sequence in the time interval starting from the second time point to the first time point while, on the other hand, the second optical flow segments detected in the step S132 indicate loci of the one or more moving objects apparently moved at a low moving speed in the moving picture sequence in the time interval starting from the third time point to the first time point The second optical flow segments detected in the step S132, however, may include false optical flow segments inaccurately indicate loci of a moving object apparently moved at a moving speed so high that the moving object apparently moved in the time interval starting from the third time point to the first time point to an undetectable area away from the detectable area in which optical flow segments can be properly detected and generated as shown in FIG. 9. In FIG. 9, a moving object 910 indicated by, for example, a current picture frame is apparently moved from a moving object 920 indicated by a past picture frame earlier than the current picture frame. The logical addition of an area in which the moving object 910 occupies in the current picture frame and an area in which the moving object 820 occupies in the past picture frame is an optical flow generating area 940. Assuming that the moving object 910 is placed in the undetectable area in which optical flow segment cannot be properly detected and generated, the optical flow generating area 940 may contain a false optical flow generating area 930 in which in which false optical flow segments inaccurately indicating loci of a moving object are detected.

In order to eliminate the false optical flow segments, the moving object detecting method according to the present invention further comprises the steps S123, S133, and S142. In the step S123, the fourth picture frame is inputted. The step S123 goes forward to the step S133 in which the third optical flow segments indicative of loci of the one or more moving objects apparently moved in the moving picture sequence in a time interval starting from the fourth time point to the third time point is detected on the basis of the third picture frame inputted in the step S122 and the fourth picture frame inputted in the step S123.

Figure 10:
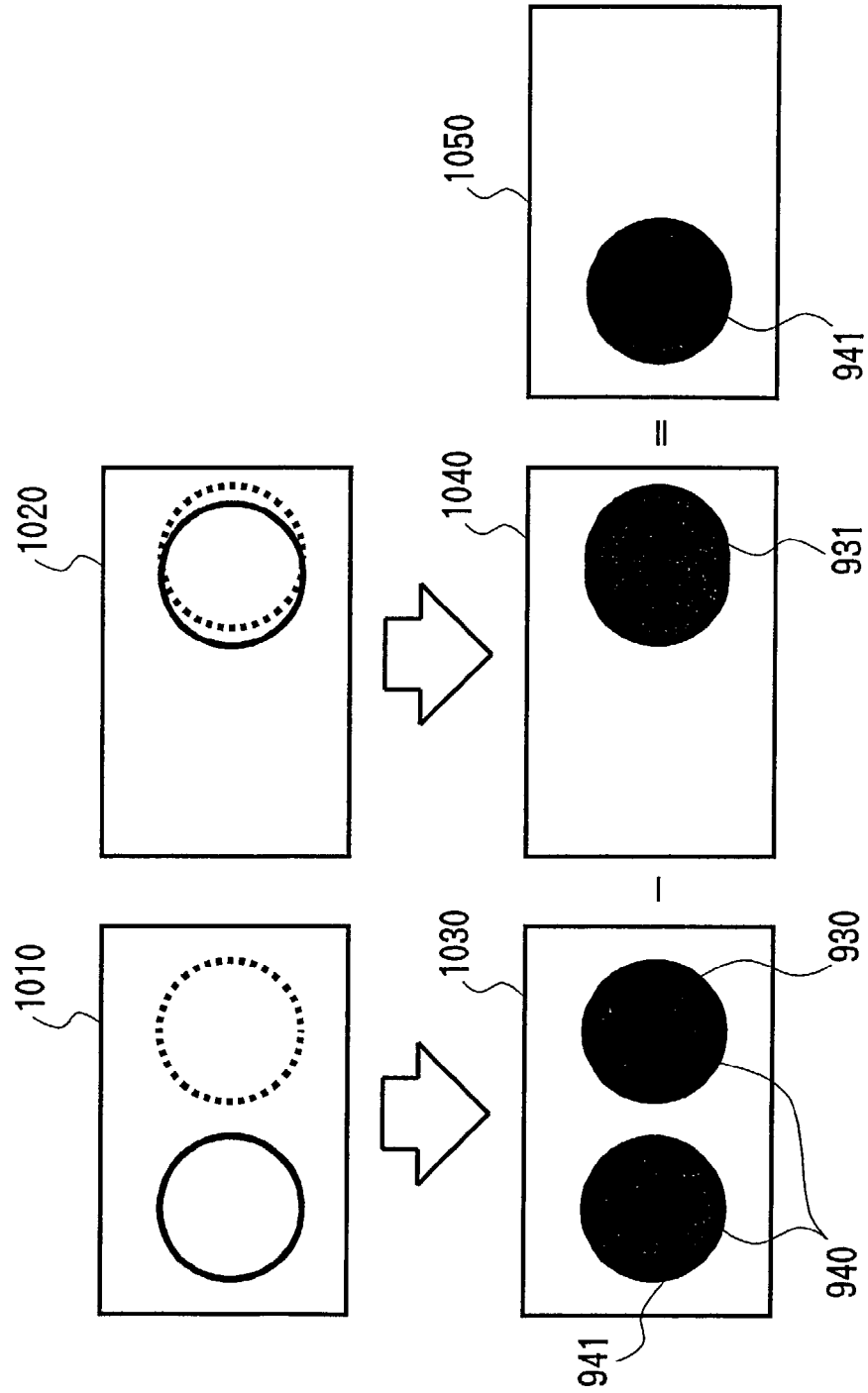
FIG. 10 is a schematic diagram explaining a principle of eliminating false optical flow segments inaccurately indicating loci of a moving object.

The principle of eliminating the false optical flow segments will be described in detail with reference to FIGS. 10 and 11. In FIG. 10, pictures designated by 1010 and 1030 indicate an apparent motion of a moving object moved at a high moving speed and an optical flow generating area 940 generated on the basis of picture frames in a long time interval, while, on the other hand, pictures designated by 1020 and 1040 indicate an apparent motion of the moving object moved at the high speed and an optical flow generating area 931 generated on the basis of picture frames inputted in a short time interval. The moving object apparently moved from an area 930 to an area 941. Assuming that the area 941 is an undetectable area with respect to the area 930 in which optical flow segments cannot be properly detected and generated, the optical flow generating area 940 contains a false optical flow generating area 930 in which false optical flow segments inaccurately indicating loci of the moving object are detected and generated. In order to eliminate the false optical flow segments, the optical flow generating area 931 generated on the basis of picture frames inputted in a short time interval is subtracted from the optical flow generating area 940 generated on the basis of picture frames inputted in a long time interval to generate a new optical flow generating area 941, which is supposed to hardly contain the false optical flow segments as shown in a picture designated by 1050. In FIG. 11, pictures designated by 1110 and 1130 indicate an apparent motion of a moving object moved at a low moving speed and an optical flow generating area generated on the basis of picture frames in a long time interval. Pictures designated by 1120 and 1140 are supposed to indicate an apparent motion of the moving object moved at the low speed and an optical flow generating area generated on the basis of picture frames inputted in a short time interval. The moving object apparently moved at a very low speed with respect to the short time interval so that no optical flow generation area, however, is generated in the picture designated by 1140. The moving object apparently moved a very short distance as shown in the pictures designated by 1110 and 1130. In this case, no optical flow generating area is subtracted from the optical flow generating area generated on the basis of picture frames inputted in a long time interval.

This leads to the fact that the third optical flow segments indicative of loci of the one or more moving objects apparently moved in a short time interval starting from the fourth time point to the third time point detected in the step S133 are to be subtracted from the second optical flow segments indicative of loci of the one or more moving objects apparently moved in the moving picture sequence in a long time interval starting from the third time point to the first time point detected in the step S132 in order to eliminate the false optical flow segment generating area.

The step S133 goes forward to the step S142 in which the third optical flow segments detected in the step S133 from the second optical flow segments detected in the step S132 to generate filtered optical flow segments indicative of loci of the one or more moving objects apparently moved in the moving picture sequence in the time interval starting from the third time point to the first time point.

The step S142 goes forward to the step S150 in which the filtered optical flow segments generated in the step S142 are added to the first optical flow segments detected in the step S131 to generate integrated optical flow segments indicative of loci of the one or more moving objects apparently moved in the moving picture sequence in the time interval starting from the third time point to the first time point, which contain false less optical flow segments.

As described earlier, the first optical flow segments detected in the step S131 indicate loci of the one or more moving objects apparently moved at a high moving speed in the moving picture sequence in the time interval starting from the second time point to the first time point while, on the other hand, the filtered optical flow segments generated in the step S142 from the second optical flow segments detected in the step S132 indicate loci of the one or more moving objects apparently moved at a low moving speed in the moving picture sequence in the time interval starting from the third time point to the first time point. This means that the integrated optical flow segments thus generated can indicate loci of one or more moving objects apparently moved at a high moving speed in the moving picture sequence in the time interval starting from the second time point to the first time point, and loci of one or more moving objects apparently moved at a low moving speed in the moving picture sequence in the time interval starting from the third time point to the first time point.

From the foregoing description, it is to be understood that the first embodiment of the moving object detecting method according to the present invention can detect optical flow segments indicative of loci of one or more moving objects apparently moved at variable moving speeds in a moving picture sequence including a plurality of picture frames each indicating the one or more moving objects at a time point to ensure that the moving objects are correctly detected.

Furthermore, the first embodiment of the moving object detecting method according to the present invention can accurately detect optical flow segments indicative of loci of one or more moving objects apparently moved at variable moving speeds in a moving picture sequence including a plurality of picture frames each indicating the one or more moving objects at a time point by eliminating false optical flow segments which inaccurately indicate loci of a moving object apparently moved at a moving speed so high that the moving object apparently moved to an undetectable area away from the detectable area in which optical flow segments can be properly detected and generated to ensure that the moving objects are correctly detected.

Figure 3:
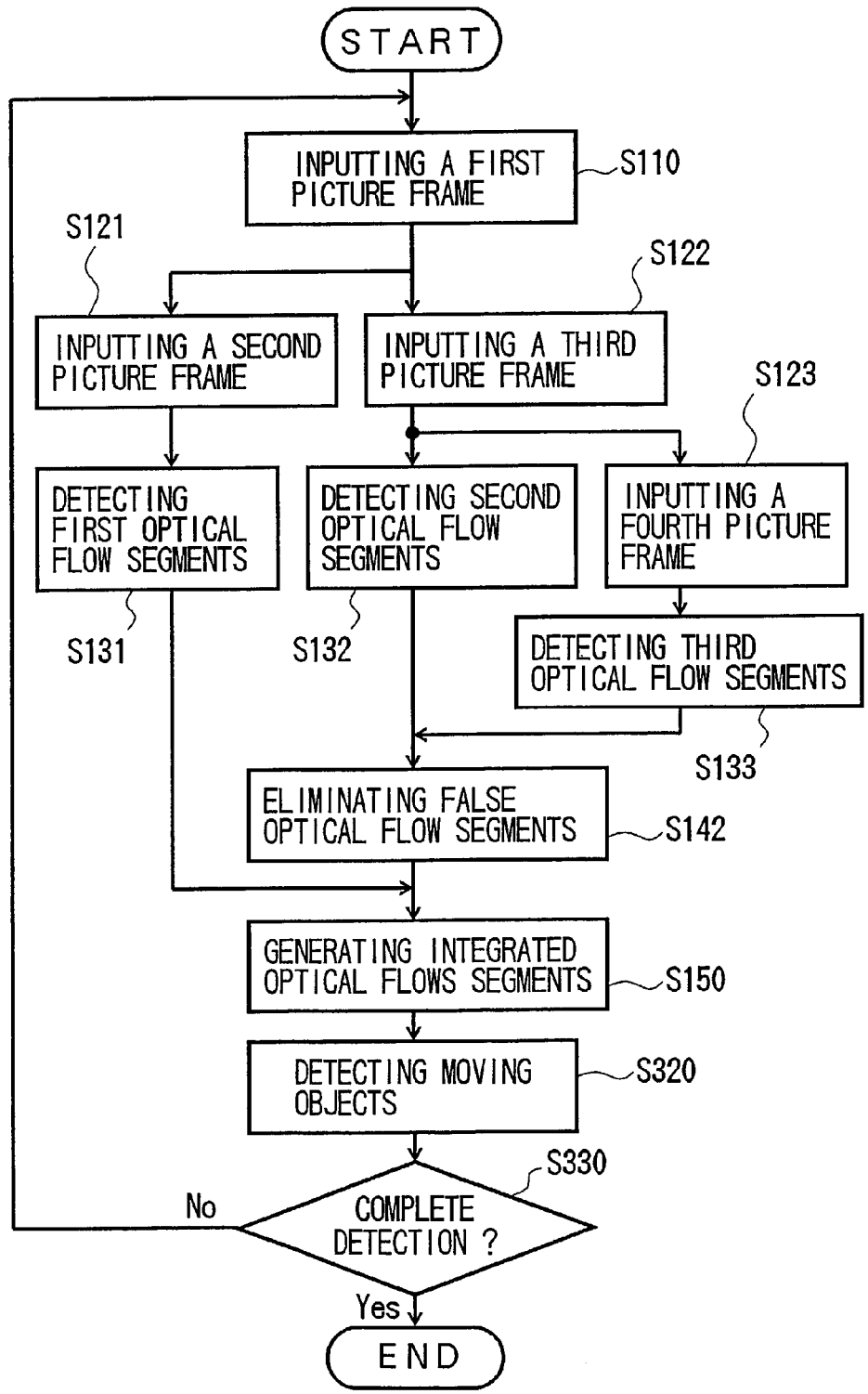
FIG. 3 is a flowchart showing a second embodiment of the moving object detecting method according to the present invention.

Referring then to FIG. 3 of the drawings, there is shown a second preferred embodiment of the moving object detecting method according to the present invention. The second embodiment of the moving object detecting method is similar to the first embodiment of the moving object detecting method except for the fact that the second embodiment of the moving object detecting method further comprises the step of detecting the moving objects.

The second embodiment of the moving object detecting method according to the present invention will be described with reference to FIG. 3.

In the step S110, the first picture frame is inputted. The step S110 goes forward to the step S121, in which the second picture frame is inputted. The step S121 goes forward to the step S131, in which first optical flow segments indicative of loci of the one or more moving objects apparently moved in the moving picture sequence in a time interval starting from the second time point to the first time point is detected on the basis of the first picture frame inputted in the step S110 and the second picture frame inputted in the step S121. In the step S122, the second picture frame is inputted. The step S122 goes forward to the step S132, in which second optical flow segments indicative of loci of the one or more moving objects apparently moved in the moving picture sequence in a time interval starting from the third time point to the first time point is detected on the basis of the first picture frame inputted in the step S110 and the third picture frame inputted in the step S122 in a similar manner as described above.

In the step S123, the fourth picture frame is inputted. The step S123 goes forward to the step S133 in which the third optical flow segments indicative of loci of the one or more moving objects apparently moved in the moving picture sequence in a time interval starting from the fourth time point to the third time point is detected on the basis of the third picture frame inputted in the step S122 and the fourth picture frame inputted in the step S123. The step S133 goes forward to the step S142 in which the third optical flow segments detected in the step S133 from the second optical flow segments detected in the step S132 to generate filtered optical flow segments indicative of loci of the one or more moving objects apparently moved in the moving picture sequence in the time interval starting from the third time point to the first time point.

The step S142 goes forward to the step S150 in which the filtered optical flow segments generated in the step S142 are added to the first optical flow segments detected in the step S131 to generate integrated optical flow segments indicative of loci of the one or more moving objects apparently moved in the moving picture sequence in the time interval starting from the third time point to the first time point, which contain false less optical flow segments.

The second embodiment of the moving object detecting method according to the present invention further comprises the step S320. In the step S320, the moving objects are detected on the basis of the integrated optical flow segments generated in the step S150. More specifically, in the step S320, firstly neighboring areas neighboring to optical flow generating areas in which the integrated optical flow segments are detected in the step S150 are detected to obtain neighboring area information in the moving picture sequence; secondly, moving object candidate areas in the moving picture sequence in which the moving objects are supposed to be present are estimated on the basis of the neighboring area information thus detected to obtain moving object candidate area information in the moving picture sequence; and thirdly, the moving objects are detected on the basis of the moving object candidate area information thus obtained.

Then, the step S320 goes forward to the step S330, in which it is judged whether the moving object detecting process will be completed or not. If it is judged by, for example but not limited to, an operator, that the detecting process will be completed, the step S330 goes to END. Otherwise, the step S330 goes back to the step S110 and the moving object detecting process will continue with a first picture frame, a second picture frame, a third picture frame, and a fourth picture frame newly inputted.

Neighboring area information herein used is intended to mean information about neighboring areas neighboring to optical flow generating areas in which the integrated optical flow segments are detected, and may include, for example but not limited to, picture element information about the neighboring areas moving object candidate area information herein used is intended to mean information about moving object candidate area in which the moving objects are supposed to be present, and may include, for example but not limited to, picture element information about the moving object candidate area.

This means that the moving object candidate areas in which the moving objects are supposed to be present may be estimated on the basis of the neighboring area information to obtain moving object candidate area information. The neighboring area information may include information about, for example, picture element information about the neighboring areas neighboring to the optical flow generating areas in which the integrated optical flow segments are detected. The moving object candidate area information may include information about, for example but not limited to, the sizes, shapes, positions, picture elements or optical flow information of the moving object candidate areas. Then, the moving objects are detected on the basis of the moving object candidate area information thus obtained. The moving objects may be detected on the basis of, for example but not limited to, sizes, shapes, positions, picture elements or optical flow information of the moving object candidate areas, or any combination thereof. The optical flow information may include, for example but not limited to, sizes, directions, positions, and the degrees of similarity of the optical flow segments.

From the foregoing description, it is to be understood that the second embodiment of the moving object according to the present invention can detect optical flow segments indicative of loci of one or more moving objects apparently moved at variable moving speeds in a moving picture sequence including a plurality of picture frames each indicating the one or more moving objects at a time point to ensure that the moving objects are correctly detected.

Furthermore, the second embodiment of the moving object detecting method according to the present invention can accurately detect optical flow segments indicative of loci of one or more moving objects apparently moved at variable moving speeds in a moving picture sequence including a plurality of picture frames each indicating the one or more moving objects at a time point by eliminating false optical flow segments which inaccurately indicate loci of a moving object apparently moved at a moving speed so high that the moving object apparently moved to an undetectable area away from the detectable area in which optical flow segments can be properly detected and generated to ensure that the moving objects are correctly detected.

Figure 4:
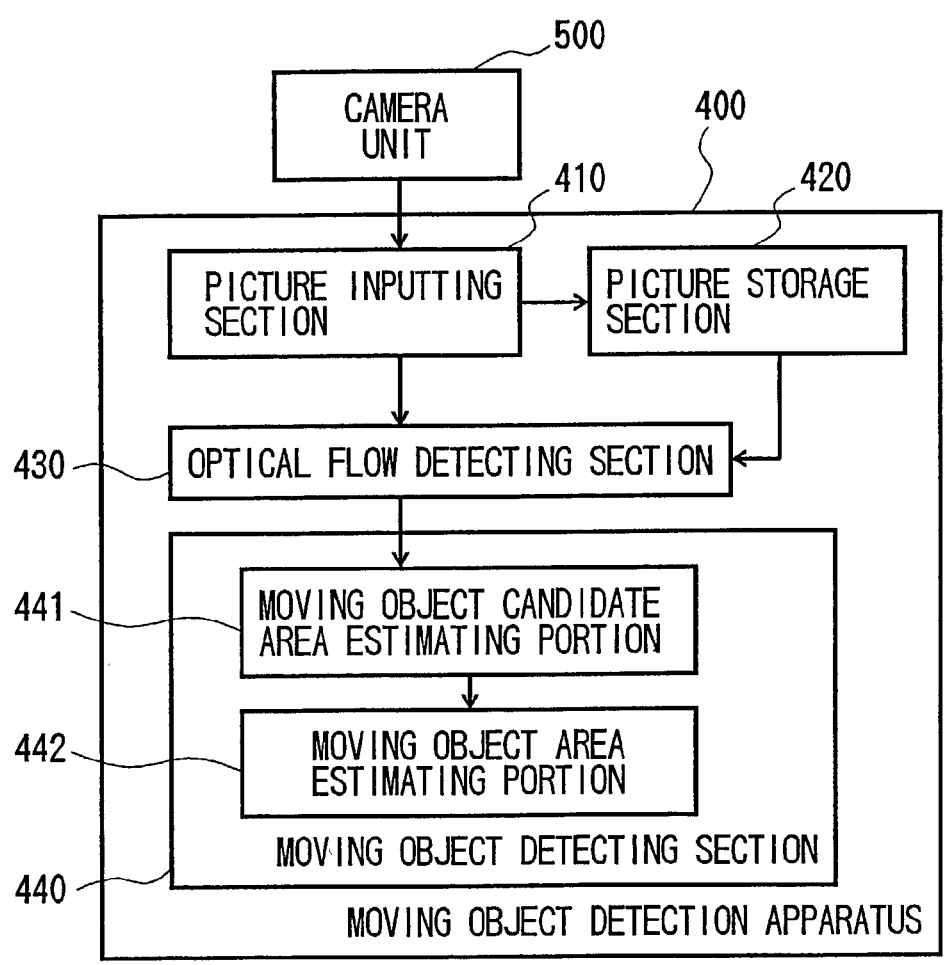
FIG. 4 is a block diagram showing a third embodiment of the moving object detecting apparatus according to the present invention.

Referring to FIG. 4 of the drawings, there is shown a third preferred embodiment of the moving object detecting apparatus 400 according to the present invention. The third embodiment of the moving object detecting apparatus 400 is shown in FIG. 4 as comprising: a camera unit 500, a picture inputting section 410, a picture storage section 420, and an optical flow detecting section 430. The camera unit 500 is adapted to convert optical moving picture information into digital moving picture information to output moving picture sequence including a first picture frame indicating the one or more moving objects at a first time point, a second picture frame indicating the one or more moving objects at a second time point, a third picture frame indicating the one or more moving objects at a third time point, and a fourth picture frame indicating the one or more moving objects at a fourth time point in late order.

The picture inputting section 410 is adapted to input the moving picture sequence including the first picture frame, the second picture frame, the third picture frame, and the fourth picture frame. The picture storage section 420 is adapted to store the moving picture sequence including the first picture frame, the second picture frame, the third picture frame, and the fourth picture frame inputted by the picture inputting section 410.

The optical flow detecting section 430 is adapted to detect integrated optical flow segments on the basis of the first picture frame inputted by the picture inputting section 410 and the second picture frame, the third picture frame, and the fourth picture frame stored in the picture storage section 420 by performing the first embodiment of the moving object detecting method as described earlier.

This means that the optical flow detecting section 430 includes: a first optical flow detecting portion (not shown), a second optical flow detecting portion (not shown), a false optical flow detecting portion (not shown), an optical flow subtracting portion (not shown), and an optical flow adding portion (not shown).

The first optical flow detecting portion is adapted to detect first optical flow segments indicative of loci of the one or more moving objects apparently moved in the moving picture sequence in a time interval starting from the second time point to the first time point on the basis of the first picture frame inputted by the picture inputting section 410 and the second picture frame stored in the picture storage section 420. The second optical flow detecting portion is adapted to detect second optical flow segments indicative of loci of the one or more moving objects apparently moved in the moving picture sequence in a time interval starting from the third time point to the first time point on the basis of the first picture frame inputted by the picture inputting section 410 and the third picture frame stored in the picture storage section 420.

More specifically, the first optical flow detecting portion includes: a first picture frame dividing unit (not shown), a second picture frame dividing unit (not shown), a comparing unit (not shown), and an optical flow detecting unit (not shown).

The first picture frame dividing unit is adapted to divide the first picture frame stored in the picture storage section 420 into a plurality of blocks each containing at least one picture element. The second picture frame dividing unit is adapted to divide the second picture frame stored in the picture storage section 420 into a plurality of blocks each containing at least one picture element. The comparing unit is adapted to sequentially compare each of the blocks of the second picture frame divided by the second picture frame dividing unit with blocks of the first picture frame divided by the first picture frame dividing unit to select a block of the first picture frame apparently placed in the vicinity of the block of the second picture frame and having the highest degree of similarity with the block of the second picture frame from among the blocks of the first picture frame apparently placed in the vicinity of the block of the second picture frame. The optical flow detecting unit is adapted to detect optical flow segments each starting from a block of the second picture frame divided by the second picture frame dividing unit to a block of the first picture frame selected by the comparing unit apparently placed in the vicinity of the block of the second picture frame and having the highest degree of similarity with the block of the second picture frame from among the blocks of the first picture frame apparently placed in the vicinity of the block of the second picture frame.

The description hereinlater is directed to the operation of the first optical flow detecting portion.

The first picture frame dividing unit is operated to divide the first picture frame stored in the picture storage section 420 into a plurality of blocks each containing at least one picture element. The second picture frame dividing unit is operated to divide the second picture frame stored in the picture storage section 420 into a plurality of blocks each containing at least one picture element. The comparing unit is operated to sequentially compare each of the blocks of the second picture frame divided by the second picture frame dividing unit with blocks of the first picture frame divided by the first picture frame dividing unit to select a block of the first picture frame apparently placed in the vicinity of the block of the second picture frame and having the highest degree of similarity with the block of the second picture frame from among the blocks of the first picture frame apparently placed in the vicinity of the block of the second picture frame. The optical flow detecting unit is operated to detect optical flow segments each starting from a block of the second picture frame divided by the second picture frame dividing unit to a block of the first picture frame selected by the comparing unit apparently placed in the vicinity of the block of the second picture frame and having the highest degree of similarity with the block of the second picture frame from among the blocks of the first picture frame apparently placed in the vicinity of the block of the second picture frame.

The false optical flow detecting portion is adapted to detect third optical flow segments indicative of loci of the one or more moving objects apparently moved in the moving picture sequence in a time interval starting from the fourth time point to the third time point on the basis of the third picture frame stored in the picture storage section 420 and the fourth picture frame stored in the picture storage section 420. The optical flow subtracting portion is adapted to subtract the third optical flow segments detected by the false optical flow detecting portion from the second optical flow segments detected in the second optical flow detecting portion to generate filtered optical flow segments indicative of loci of the one or more moving objects apparently moved in the moving picture sequence in the time interval starting from the third time point to the first time point.

The optical flow adding portion is adapted to add the filtered optical flow segments generated by the optical flow subtracting portion to the first optical flow segments detected by the first optical flow detecting portion to generate integrated optical flow segments indicative of loci of the one or more moving objects apparently moved in the moving picture sequence in the time interval starting from the third time point to the first time point.

The third embodiment of the moving object detecting apparatus 400 further comprises a moving object detecting section 440. The moving object detecting section 440 is adapted to detect the moving objects on the basis of the integrated optical flow segments detected by the optical flow detecting section 430 by carrying out the step S320 of the second embodiment of the moving object detecting method as described earlier. The moving object detecting section 440 includes: a moving object candidate area estimating portion 441 and a moving object area estimating portion 442.

The moving object candidate area estimating portion 441 is adapted to detect neighboring areas neighboring to optical flow generating areas in which the integrated optical flow segments are detected by the optical flow detecting section 430 to obtain neighboring area information, and estimate moving object candidate areas in which the moving objects are supposed to be present on the basis of the neighboring area information detected thus detected to obtain moving object candidate area information. The moving object area estimating portion 442 is adapted to estimate moving object areas in which the moving objects are present on the basis of the moving object candidate area information thus obtained by the moving object candidate area estimating portion 441 to detect the moving objects.

The operation of the third embodiment of the moving object detecting apparatus will be described hereinlater.

The picture inputting section 410 is operated to input the moving picture sequence including the first picture frame, the second picture frame, the third picture frame, and the fourth picture frame. The picture storage section 420 is operated to store the moving picture sequence including the first picture frame, the second picture frame, the third picture frame, and the fourth picture frame inputted by the picture inputting section 410.

The optical flow detecting section 430 is operated to detect integrated optical flow segments on the basis of the first picture frame inputted by the picture inputting section 410 and the second picture frame, the third picture frame, and the fourth picture frame stored in the picture storage section 420 by performing the first embodiment of the moving object detecting method as described earlier. The detailed description about the operation of the optical flow detecting section 430 will be therefore omitted to avoid tedious repetition.

The moving object detecting section 440 is operated to detect the moving objects on the basis of the integrated optical flow segments detected by the optical flow detecting section 430 by carrying out the step S320 of the second embodiment of the moving object detecting method as described earlier. The operation of the moving object detecting section 440 will be omitted from description to avoid tedious repetition.

In the third embodiment of the moving object detecting apparatus according to the present invention, the first optical flow detecting portion may detect first optical flow segments indicative of loci of the one or more moving objects apparently moved in the moving picture sequence in a time interval starting from the second time point to the first time point on the basis of the first picture frame inputted by the picture inputting section 410 and the second picture frame stored in the picture storage section 420 and the second optical flow detecting portion may detect second optical flow segments indicative of loci of the one or more moving objects apparently moved in the moving picture sequence in a time interval starting from the third time point to the first time point on the basis of the first picture frame inputted by the picture inputting section 410 and the third picture frame stored in the picture storage section 420.

Alternatively, the first optical flow detecting portion may detect first optical flow segments indicative of loci of the one or more moving objects apparently moved in the moving picture sequence in a time interval starting from the second time point to the first time point on the basis of the first picture frame and the second picture frame stored in the picture storage section 420. Furthermore, the second optical flow detecting portion may detect second optical flow segments indicative of loci of the one or more moving objects apparently moved in the moving picture sequence in a time interval starting from the third time point to the first time point on the basis of the first picture frame and the third picture frame stored in the picture storage section 420.

From the foregoing description, it is to be understood that the third embodiment of the moving object detecting apparatus according to the present invention can detect optical flow segments indicative of loci of one or more moving objects apparently moved at variable moving speeds in a moving picture sequence including a plurality of picture frames each indicating the one or more moving objects at a time point to ensure that the moving objects are correctly detected.

Furthermore, the third embodiment of the moving object detecting apparatus according to the present invention can accurately detect optical flow segments indicative of loci of one or more moving objects apparently moved at variable moving speeds in a moving picture sequence including a plurality of picture frames each indicating the one or more moving objects at a time point by eliminating false optical flow segments which inaccurately indicate loci of a moving object apparently moved at a moving speed so high that the moving object apparently moved to an undetectable area away from the detectable area in which optical flow segments can be properly detected and generated to ensure that the moving objects are correctly detected.

Figure 5:
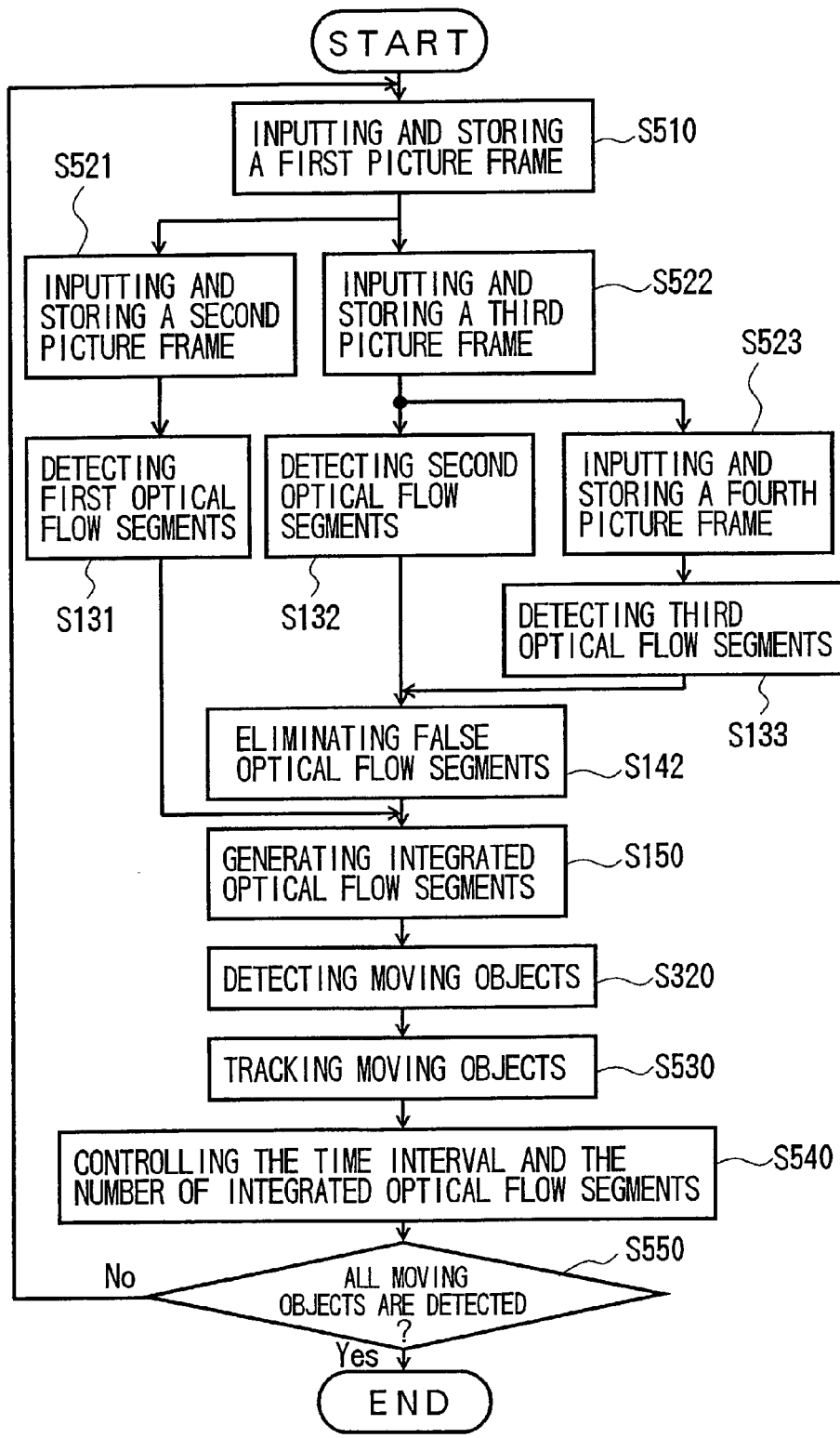
FIG. 5 is a flowchart showing a fourth embodiment of the moving object detecting method according to the present invention.

Referring to FIG. 5 of the drawings, there is shown a fourth preferred embodiment of the moving object detecting method according to the present invention. The fourth embodiment of the moving object detecting method is similar to the second embodiment of the moving object detecting method except for the fact that the fourth embodiment of the moving object detecting method further comprises the steps of storing the first picture frame, the second picture frame, the third picture frame, and the fourth picture frame, tracking the moving objects and controlling the time interval between the first time point and the second time point, the time interval between the second time point and the third time point, and the time interval between the third time point and the fourth time point, and the number of the integrated optical flow segments on the basis of the moving object information.

The fourth embodiment of the moving object detecting method according to the present invention will be described with reference to FIG. 5.

In the step S510, the first picture frame is inputted and stored. The step S510 goes forward to the step S521, in which the second picture frame is inputted and stored. The step S521 goes forward to the step S131, in which first optical flow segments indicative of loci of the one or more moving objects apparently moved in the moving picture sequence in a time interval starting from the second time point to the first time point is detected on the basis of the first picture frame inputted and stored in the step S510 and the second picture frame inputted and stored the step S521. In the step S522, the second picture frame is inputted and stored. The step S522 goes forward to the step S132, in which second optical flow segments indicative of loci of the one or more moving objects apparently moved in the moving picture sequence in a time interval starting from the third time point to the first time point is detected on the basis of the first picture frame inputted and stored the step S510 and the third picture frame inputted and stored the step S522 in a similar manner as described above.

In the step S523, the fourth picture frame is inputted and stored. The step S523 goes forward to the step S133 in which the third optical flow segments indicative of loci of the one or more moving objects apparently moved in the moving picture sequence in a time interval starting from the fourth time point to the third time point is detected on the basis of the third picture frame inputted and stored in the step S522 and the fourth picture frame inputted and stored in the step S523. The step S133 goes forward to the step S142 in which the third optical flow segments detected in the step S133 from the second optical flow segments detected in the step S132 to generate filtered optical flow segments indicative of loci of the one or more moving objects apparently moved in the moving picture sequence in the time interval starting from the third time point to the first time point.

The step S142 goes forward to the step S150 in which the filtered optical flow segments generated in the step S142 are added to the first optical flow segments detected in the step S131 to generate integrated optical flow segments indicative of loci of the one or more moving objects apparently moved in the moving picture sequence in the time interval starting from the third time point to the first time point, which contain false less optical flow segments. The step S150 goes forward to the step S320, in which the moving objects are detected on the basis of the integrated optical flow segments generated in the step S150. The step S150 goes forward to the step S320 in which the moving objects are detected on the basis of the integrated optical flow segments generated in the step S150.

The fourth embodiment of the moving object detecting method according to the present invention further comprises the step 530 of tracking the moving objects and the step S540 of controlling the time interval between the first time point and the second time point, the time interval between the second time point and the third time point, and the time interval between the third time point and the fourth time point, and the number of the integrated optical flow segments on the basis of the moving object information.

The step S320 goes forward to the step S530, in which the moving objects in the moving picture sequence detected in the step S320 are tracked on the basis of the moving object candidate area information in the moving picture sequence accumulatively obtained in the second step of step S320 to estimate moving object information including, for example but not limited to, the number of the moving objects and the amount of apparent motion made by the moving objects. Then, the step S530 goes forward to the step S540, in which the time interval between the first time point and the second time point, the time interval between the second time point and the third time point, and the time interval between the third time point and the fourth time point, and the number of the integrated optical flow segments are controlled on the basis of the moving object information estimated in the step S530.

The step S540 goes forward to the step S550, in which it is judged whether the moving object detecting process will be completed or not. If it is judged by, for example but not limited to, an operator, that all the moving objects are detected, the step S540 goes to END. Otherwise, the step S540 goes back to the step S510 and the moving object detecting process will continue with a first picture frame, a second picture frame, a third picture frame, and a fourth picture frame newly inputted.

More specifically, in the step S320, firstly, neighboring areas neighboring to optical flow generating areas in which the integrated optical flow segments are detected in the step S150 are detected to obtain neighboring area information in the moving picture sequence, secondly, moving object candidate areas in the moving picture sequence in which the moving objects are supposed to be present are estimated on the basis of the neighboring area information thus obtained to obtain moving object candidate area information in the moving picture sequence; and thirdly, the moving objects are detected on the basis of the moving object candidate area information thus obtained. The steps S510 to S540 are repeated until it is judged that the moving object detecting process will be completed. This means that the steps S510 to S320 are repeated, and the step S320 goes forward to the step S530, in which moving object candidate area information obtained in the second step of the step S320, and the moving objects detected in the third step of the step S320 are accumulatively stored, and then, the moving object candidate areas apparently moved in the moving picture frame sequence are compared on the basis of the moving object candidate area information accumulatively previously stored to track the moving objects detected in the third step of the step S320 to estimate moving object information about the moving objects. Then, the step S530 goes forward to the step S540, in which the time interval between the first time point and the second time point, the time interval between the second time point and the third time point, and the time interval between the third time point and the fourth time point, and the number of the integrated optical flow segments are controlled on the basis of the moving object information estimated in the step S530.

The fourth embodiment of the moving object detecting method thus described can adaptively and effectively change the time interval between the first time point and the second time point, the time interval between the second time point and the third time point, and the time interval between the third time point and the fourth time point, and the number of the integrated optical flow segments are controlled in accordance with the apparent motion of the moving object. This means that the fourth embodiment of the moving object detecting method can, for example, shorten the time interval starting from a past time point to a current time point to detect and generate optical flow segments indicative of apparent motion of a moving object moving at a high moving speed so that the moving object apparently moved in the moving picture sequence would remain in the detectable area, i.e., the blocks of the current picture frame at the current time point apparently placed in the vicinity of the block of the past picture frame at the past time point by a predetermined number of blocks or less while, on the other hand, that the fourth embodiment of the moving object detecting method can lengthen the time interval starting from a past time point to a current time point to detect and generate optical flow segments indicative of apparent motion of a moving object moving at a low moving speed so that the optical flow segments indicative of the apparent motion of the moving object apparently moved in the time interval would be detected and generated. This leads to the fact that the fourth embodiment of the moving object detecting method can stably detect optical flow segments to ensure that the moving objects are correctly detected.

From the foregoing description, it is to be understood that the fourth embodiment of the moving object detecting method according to the present invention can detect optical flow segments indicative of loci of one or more moving objects apparently moved at variable moving speeds in a moving picture sequence including a plurality of picture frames each indicating the one or more moving objects at a time point to ensure that the moving objects are correctly detected.

Furthermore, the fourth embodiment of the moving object detecting method according to the present invention can accurately detect optical flow segments indicative of loci of one or more moving objects apparently moved at variable moving speeds in a moving picture sequence including a plurality of picture frames each indicating the one or more moving objects at a time point by eliminating false optical flow segments which inaccurately indicate loci of a moving object apparently moved at a moving speed so high that the moving object apparently moved to an undetectable area away from the detectable area in which optical flow segments can be properly detected and generated to ensure that the moving objects are correctly detected.

Figure 6:
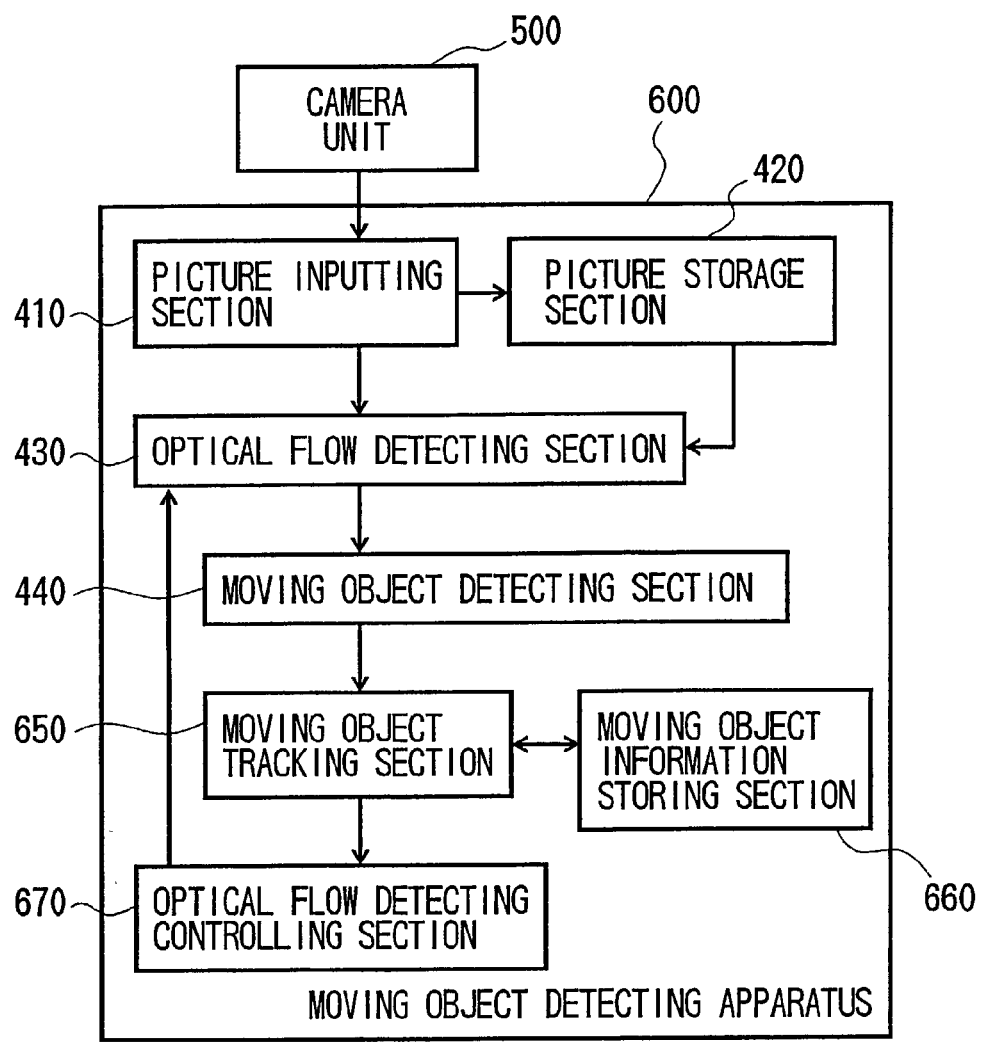
FIG. 6 is a block diagram showing a fifth embodiment of the moving object detecting apparatus according to the present invention.

Referring to FIG. 6 of the drawings, there is shown a fifth preferred embodiment of the moving object detecting apparatus 600 according to the present invention. The fifth embodiment of the moving object detecting apparatus 600 is similar to the third embodiment of the moving object detecting apparatus 400 except for the fact that the fifth embodiment of the moving object detecting apparatus 600 further comprises a moving object tracking section 650 for tracking the moving objects, a moving object information storing section 660 for accumulatively storing the moving object information, and an optical flow detecting controlling section 670 for controlling the time interval between the first time point and the second time point, the time interval between the second time point and the third time point, and the time interval between the third time point and the fourth time point, and the number of the integrated optical flow segments on the basis of the moving object information stored in the moving object information storing section 660. The same constitutional elements are simply represented by the same reference numerals as those of the third embodiment of the moving object detecting apparatus 400, and will be thus omitted from detailed description for avoiding tedious repetition.

The fifth embodiment of the moving object detecting apparatus 600 will be described with reference to FIG. 6. The fifth embodiment of the moving object detecting apparatus 600 is shown in FIG. 6 as comprising: a camera unit 500, a picture inputting section 410, a picture storage section 420, and an optical flow detecting section 430, a moving object detecting section 440, a moving object tracking section 650, a moving object information storing section 660, and an optical flow detecting controlling section 670.

The camera unit 500 is adapted to output moving picture sequence including a first picture frame indicating the one or more moving objects at a first time point, a second picture frame indicating the one or more moving objects at a second time point, a third picture frame indicating the one or more moving objects at a third time point, and a fourth picture frame indicating the one or more moving objects at a fourth time point in late order.

The picture inputting section 410 is adapted to input the moving picture sequence including the first picture frame, the second picture frame, the third picture frame, and the fourth picture frame. The picture storage section 420 is adapted to store the moving picture sequence including the first picture frame, the second picture frame, the third picture frame, and the fourth picture frame inputted by the picture inputting section 410.

The optical flow detecting section 430 is adapted to detect integrated optical flow segments on the basis of the first picture frame inputted by the picture inputting section 410 and the second picture frame, the third picture frame, and the fourth picture frame stored in the picture storage section 420 by performing the first embodiment of the moving object detecting method as described earlier.

The moving object detecting section 440 is adapted to detect the moving objects on the basis of the integrated optical flow segments detected by the optical flow detecting section 430. More specifically, the moving object detecting section 440 includes: a moving object candidate area estimating portion 441 and a moving object area estimating portion 442. The moving object candidate area estimating portion 441 is adapted to detect neighboring areas neighboring to optical flow generating areas in which the integrated optical flow segments are detected by the optical flow detecting section 430 to obtain neighboring area information, and estimate moving object candidate areas in which the moving objects are supposed to be present on the basis of the neighboring area information detected thus detected to obtain moving object candidate area information. The moving object area estimating portion 442 is adapted to estimate moving object areas in which the moving objects are present on the basis of the moving object candidate area information thus obtained by the moving object candidate area estimating portion 441 to detect the moving objects.

The moving object tracking section 650 is adapted to track the moving objects detected by the moving object detecting section 440 on the basis of the moving object candidate area information in the moving picture sequence obtained by the moving object candidate area estimating portion 441 to estimate moving object information including, for example but not limited to, the number of the moving objects and the amount of apparent motion made by the moving objects.

The optical flow detecting controlling section 670 is adapted to control the time interval between the first time point and the second time point, the time interval between the second time point and the third time point, and the time interval between the third time point and the fourth time point, and the number of the integrated optical flow segments on the basis of the moving object information estimated by the moving object tracking section 650.

The operation of the fifth embodiment of the moving object detecting apparatus 600 will be described hereinlater.

The camera unit 500 is operated to output moving picture sequence including a first picture frame indicating the one or more moving objects at a first time point, a second picture frame indicating the one or more moving objects at a second time point, a third picture frame indicating the one or more moving objects at a third time point, and a fourth picture frame indicating the one or more moving objects at a fourth time point in late order.

The picture inputting section 410 is operated to input the moving picture sequence including the first picture frame, the second picture frame, the third picture frame, and the fourth picture frame. The picture storage section 420 is operated to store the moving picture sequence including the first picture frame, the second picture frame, the third picture frame, and the fourth picture frame inputted by the picture inputting section 410.

The optical flow detecting section 430 is operated to detect integrated optical flow segments on the basis of the first picture frame inputted by the picture inputting section 410 and the second picture frame, the third picture frame, and the fourth picture frame stored in the picture storage section 420 by performing the first embodiment of the moving object detecting method as described earlier.

The moving object detecting section 440 is operated to detect the moving objects on the basis of the integrated optical flow segments detected by the optical flow detecting section 430. More specifically, the moving object detecting section 440 includes: a moving object candidate area estimating portion 441 and a moving object area estimating portion 442. The moving object candidate area estimating portion 441 is operated to detect neighboring areas neighboring to optical flow generating areas in which the integrated optical flow segments are detected by the optical flow detecting section 430 to obtain neighboring area information, and estimate moving object candidate areas in which the moving objects are supposed to be present on the basis of the neighboring area information detected thus detected to obtain moving object candidate area information. The moving object area estimating portion 442 is operated to estimate moving object areas in which the moving objects are present on the basis of the moving object candidate area information thus obtained by the moving object candidate area estimating portion 441 to detect the moving objects.

The moving object tracking section 650 is operated to track the moving objects detected by the moving object detecting section 440 on the basis of the moving object candidate area information in the moving picture sequence obtained by the moving object candidate area estimating portion 441 to estimate moving object information including, for example but not limited to, the number of the moving objects and the amount of apparent motion made by the moving objects.

The optical flow detecting controlling section 670 is operated to control the time interval between the first time point and the second time point, the time interval between the second time point and the third time point, and the time interval between the third time point and the fourth time point, and the number of the integrated optical flow segments on the basis of the moving object information stored in the moving object information storing section 660.

Furthermore, the picture inputting section 410 may, for example, sequentially input the moving picture sequence including the first picture frame, the second picture frame, the third picture frame, and the fourth picture frame. The description hereinlater will be directed to the operation of the fifth embodiment of the moving object detecting apparatus 600 sequentially inputting the moving picture sequence including the first picture frame, the second picture frame, the third picture frame, and the fourth picture frame. The picture inputting section 410 is operative to sequentially input the moving picture sequence including the first picture frame, the second picture frame, the third picture frame, and the fourth picture frame. The picture storage section 420 is operative to sequentially store the moving picture sequence including the first picture frame, the second picture frame, the third picture frame, and the fourth picture frame inputted by the picture inputting section 410.

The optical flow detecting section 430 is operative to sequentially detect integrated optical flow segments on the basis of the first picture frame inputted by the picture inputting section 410 and the second picture frame, the third picture frame, and the fourth picture frame stored in the picture storage section 420. The moving object detecting section 440 is operative to sequentially detecting the moving objects on the basis of the integrated optical flow segments detected by the optical flow detecting section 430. The moving object information storing section 660 is operative to accumulatively store the moving object candidate area information in the moving picture sequence sequentially obtained by the moving object candidate area estimating portion 441 of the moving object detecting section 440.

The moving object tracking section 650 is operative to track the moving objects detected by the moving object detecting section 440 on the basis of the moving object candidate area information in the moving picture sequence accumulatively stored in the moving object information storing section 660 to estimate moving object information including the number of the moving objects and the amount of apparent motion made by the moving objects.

Alternatively, the moving object tracking section 650 may includes a moving object information storing portion (not shown), and a comparing portion (not shown).

The moving object information storing portion is operative to accumulatively store the moving objects detected by the moving object area estimating portion 442 and the moving object candidate area information in the moving picture sequence obtained by the moving object candidate area estimating portion 441. The comparing portion is operative to compare the moving object candidate areas apparently moved in the moving picture frame sequence on the basis of the moving object candidate area information accumulatively stored in the moving object information storing portion to track the moving objects detected by the moving object area estimating portion 442 to estimate moving object information about the moving objects.

The fifth embodiment of the moving object detecting apparatus 600 thus constructed can adaptively and effectively change the time interval between the first time point and the second time point, the time interval between the second time point and the third time point, and the time interval between the third time point and the fourth time point, and the number of the integrated optical flow segments are controlled in accordance with the apparent motion of the moving object.

From the foregoing description, it is to be understood that the fifth embodiment of the moving object detecting apparatus according to the present invention can detect optical flow segments indicative of loci of one or more moving objects apparently moved at variable moving speeds in a moving picture sequence including a plurality of picture frames each indicating the one or more moving objects at a time point to ensure that the moving objects are correctly detected.

Furthermore, the fifth embodiment of the moving object detecting apparatus according to the present invention can accurately detect optical flow segments indicative of loci of one or more moving objects apparently moved at variable moving speeds in a moving picture sequence including a plurality of picture frames each indicating the one or more moving objects at a time point by eliminating false optical flow segments which inaccurately indicate loci of a moving object apparently moved at a moving speed so high that the moving object apparently moved to an undetectable area away from the detectable area in which optical flow segments can be properly detected and generated to ensure that the moving objects are correctly detected.

Figure 7:
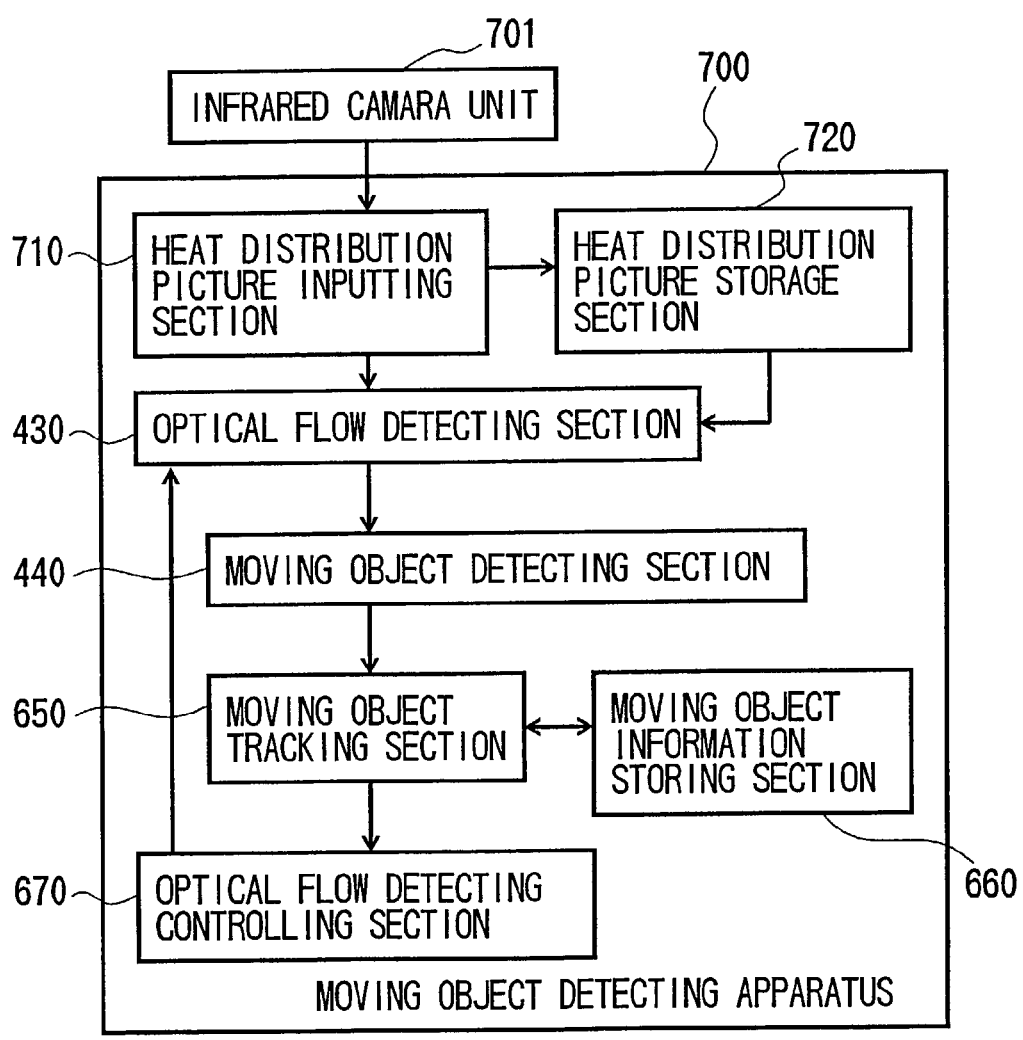
FIG. 7 is a block diagram showing a sixth embodiment of the moving object detecting apparatus according to the present invention.

Referring to FIG. 7 of the drawings, there is shown a sixth preferred embodiment of the moving object detecting apparatus 700 according to the present invention. The elements and the parts of sixth embodiment of the moving object detecting apparatus 700 is entirely the same as those of the fifth embodiment of the moving object detecting apparatus 600 except for the fact that the camera unit 500, the picture inputting section 410, and the picture storage section 420 of the fifth embodiment of the moving object detecting apparatus 600 are replaced with an infrared camera unit 701, a heat distribution picture inputting section 710, and a heat distribution picture storage section 720.

Therefore, only the elements and parts of the sixth embodiment of the moving object detecting apparatus 700 different from the those of the fifth embodiment of the moving object detecting apparatus 600 will be described in detail hereinlater, but the elements and the parts of the sixth embodiment of the moving object detecting apparatus 700 entirely the same as those of the fifth embodiment of the moving object detecting apparatus 600 bear the same reference numerals as those of the fifth embodiment of the moving object detecting apparatus 600, and will be thus omitted from description for avoiding tedious repetition.

The sixth embodiment of the moving object detecting apparatus 700, further comprises an infrared camera unit 701. The infrared camera unit 701 is adapted to output a moving picture sequence of a heat distribution picture sequence including a plurality of picture frames including a first picture frame indicating the one or more moving objects at a first time point, a second picture frame indicating the one or more moving objects at a second time point, a third picture frame indicating the one or more moving objects at a third time point, and a fourth picture frame indicating the one or more moving objects at a fourth time point in late order. The infrared camera unit 701 may be, for example but not limited to, a far-infrared camera unit, which permits to convert optical moving picture information into digital moving picture information even in darkness to output the moving picture sequence of a heat distribution picture sequence.

In the sixth embodiment of the moving object detecting apparatus 700, the picture inputting section 410 is replaced with a heat distribution picture inputting section 710; and the picture storage section 420 is replaced with a heat distribution picture storage section 720. The heat distribution picture inputting section 710 is adapted to input the first picture frame, the second picture frame, the third frame picture, and the fourth frame picture forming part of the moving picture sequence of a heat distribution picture sequence outputted by the infrared camera unit 701. The heat distribution picture storage section 720 is adapted to store the first picture frame, the second picture frame, the third frame picture, and the fourth frame picture forming part of the moving picture sequence of a heat distribution picture sequence inputted by the heat distribution picture inputting section 710.

The elements and the parts of the sixth embodiment of the moving object detecting apparatus 700 is entirely the same as those of the fifth embodiment of the moving object detecting apparatus 600 except for the fact that the camera unit 500, the picture inputting section 410, and the picture storage section 420 of the fifth embodiment of the moving object detecting apparatus 600 are replaced with an infrared camera unit 701, a heat distribution picture inputting section 710, and a heat distribution picture storage section 720.

From the foregoing description, it is to be understood that the sixth embodiment of the moving object detecting apparatus 700 according to the present invention can detect optical flow segments indicative of loci of one or more moving objects apparently moved at variable moving speeds in a moving picture sequence including a plurality of picture frames each indicating the one or more moving objects at a time point to ensure that the moving objects are correctly detected.

Furthermore, the sixth embodiment of the moving object detecting apparatus 700 according to the present invention can accurately detect optical flow segments indicative of loci of one or more moving objects apparently moved at variable moving speeds in a moving picture sequence including a plurality of picture frames each indicating the one or more moving objects at a time point by eliminating false optical flow segments which inaccurately indicate loci of a moving object apparently moved at a moving speed so high that the moving object apparently moved to an undetectable area away from the detectable area in which optical flow segments can be properly detected and generated to ensure that the moving objects are correctly detected.

The above described moving object detecting method is preferably implemented by software for programming a computer, typically the computer used to process the raw data obtained from a camera unit. Such program may be embodied in a program storage medium readable by machine, tangibly embodying a program of instructions executable by the machine to perform a set of method steps necessary to implement the above described program. Such program storage medium may be, for example but not limited to, a floppy disk, a CD ROM disk, a magnetic tape medium, an internal computer memory, or any other medium or device capable of storing information readable by the computer. It may be a free standing program or it may be a portion of a larger program executable by the computer.

Although the particular embodiment of the present invention has been shown and described, it will be obvious to those skilled in the art that various changes and modifications may be mode without departing from the spirit and scope of the present invention.

What is claimed is:

1. A moving object detecting method of detecting optical flow segments indicative of loci of one or more moving objects apparently moved in a moving picture sequence including a plurality of picture frames each indicating said one or more moving objects at a time point to ensure that said one or more moving objects are correctly detected, said picture frames including a first picture frame indicating said one or more moving objects at a first time point, a second picture frame indicating said one or more moving objects at a second time point, a third picture frame indicating said one or more moving objects at a third time point, and a fourth picture frame indicating said one or more moving objects at a fourth time point in late order, said method comprising the steps of:
   a) inputting said first picture frame;
   b) inputting said second picture frame;
   c) inputting said third picture frame;
   d) inputting said fourth picture frame;
   e) detecting first optical flow segments indicative of loci of said one or more moving objects apparently moved in said moving picture sequence in a time interval starting from said second time point to said first time point on the basis of said first picture frame inputted in said step (a) and said second picture frame inputted in said step (b);
   f) detecting second optical flow segments indicative of loci of said one or more moving objects apparently moved in said moving picture sequence in a time interval starting from said third time point to said first time point on the basis of said first picture frame inputted in said step (a) and said third picture frame inputted in said step (c);
   g) detecting third optical flow segments indicative of loci of said one or more moving objects apparently moved in said moving picture sequence in a time interval starting from said fourth time point to said third time point on the basis of said third picture frame inputted in said step (c) and said fourth picture frame inputted in said step (d);
   h) subtracting said third optical flow segments detected in said step (g) from said second optical flow segments detected in said step (f) to generate filtered optical flow segments indicative of loci of said one or more moving objects apparently moved in said moving picture sequence in said time interval starting from said third time point to said first time point; and
   i) adding said filtered optical flow segments generated in said step (h) to said first optical flow segments detected in said step (e) to generate integrated optical flow segments indicative of loci of said one or more moving objects apparently moved in said moving picture sequence in said time interval starting from said third time point to said first time point.

2. A moving object detecting method as set forth in claim 1, in which each of said picture frame includes a plurality of blocks, and said step (e) has the steps of:
   (e1) dividing said first picture frame inputted in said step (a) into a plurality of blocks each containing at least one picture element;
   (e2) dividing said second picture frame inputted in said step (b) into a plurality of blocks each containing at least one picture element;
   (e3) sequentially comparing each of said blocks of said second picture frame divided in said step (e2) with blocks of said first picture frame divided in said step (e1) to select a block of said first picture frame apparently placed in the vicinity of said block of said second picture frame and having the highest degree of similarity with said block of said second picture frame from among said blocks of said first picture frame apparently placed in the vicinity of said block of said second picture frame; and
   (e4) detecting optical flow segments each starting from a block of said second picture frame divided in said step (e2) to a block of said first picture frame selected in said step (e3) apparently placed in the vicinity of said block of said second picture frame and having the highest degree of similarity with said block of said second picture frame from among said blocks of said first picture frame apparently placed in the vicinity of said block of said second picture frame.

3. A moving object detecting method as set forth in claim 1, further comprising the steps of:
   j) detecting neighboring areas neighboring to optical flow generating areas in which said integrated optical flow segments are detected in said step (i) to obtain neighboring area information;
   k) estimating moving object candidate areas in said moving picture sequence in which said moving objects are supposed to be present on the basis of said neighboring area information detected in said step (j) to obtain moving object candidate area information in said moving picture sequence; and l) detecting said moving objects on the basis of said moving object candidate area information obtained in said step (k).

4. A moving object detecting method as set forth in claim 3, in which said moving object candidate area information includes information about the sizes, shapes, positions, picture elements, optical flow information of the moving object candidate areas.

5. A moving object detecting method of detecting optical flow segments indicative of loci of one or more moving objects apparently moved in a moving picture sequence including a plurality of picture frames each indicating said one or more moving objects at a time point to ensure that said one or more moving objects are correctly detected, said picture frames including a first picture frame indicating said one or more moving objects at a first time point, a second picture frame indicating said one or more moving objects at a second time point, a third picture frame indicating said one or more moving objects at a third time point, and a fourth picture frame indicating said one or more moving objects at a fourth time point in late order, said method comprising the steps of:
- a2) inputting said first picture frame;
- b2) inputting said second picture frame;
- c2) inputting said third picture frame;
- d2) inputting said fourth picture frame;
- a3) storing said first picture frame;
- b3) storing said second picture frame;
- c3) storing said third picture frame;
- d3) storing said fourth picture frame;
- e) detecting first optical flow segments indicative of loci of said one or more moving objects apparently moved in said moving picture sequence in a time interval starting from said second time point to said first time point on the basis of said first picture frame stored in said step (a2) and said second picture frame stored in said step (b2);
- f) detecting second optical flow segments indicative of loci of said one or more moving objects apparently moved in said moving picture sequence in a time interval starting from said third time point to said first time point on the basis of said first picture frame stored in said step (a2) and said third picture frame stored in said step (c2);
- g) detecting third optical flow segments indicative of loci of said one or more moving objects apparently moved in said moving picture sequence in a time interval starting from said fourth time point to said third time point on the basis of said third picture frame stored in said step (c2) and said fourth picture frame stored in said step (d2);
- h) subtracting said third optical flow segments detected in said step (g) from said second optical flow segments detected in said step (f) to generate filtered optical flow segments indicative of loci of said one or more moving objects apparently moved in said moving picture sequence in said time interval starting from said third time point to said first time point;
- i) adding said filtered optical flow segments generated in said step (h) to said first optical flow segments detected in said step (e) to generate integrated optical flow segments indicative of loci of said one or more moving objects apparently moved in said moving picture sequence in said time interval starting from said third time point to said first time point;
- j) detecting neighboring areas neighboring to optical flow generating areas in which said integrated optical flow segments are detected in said step (i) to obtain neighboring area information in said moving picture sequence;
- k) estimating moving object candidate areas in said moving picture sequence in which said moving objects are supposed to be present on the basis of said neighboring area information detected in said step (j) to obtain moving object candidate area information in said moving picture sequence; and
- l) detecting said moving objects in said moving picture sequence on the basis of said moving object candidate area information obtained in said step (k).

6. A moving object detecting method as set forth in claim 5, further comprising the steps of:
- m) repeating said steps (a2) to (l), and tracking said moving objects in said moving picture sequence detected in said step (l) on the basis of said moving object candidate area information in said moving picture sequence accumulatively obtained in said step (k) to estimate moving object information including the number of said moving objects and the amount of apparent motion made by said moving objects; and
- n) controlling the time interval between said first time point and said second time point, the time interval between said second time point and said third time point, and the time interval between said third time point and said fourth time point, and the number of said integrated optical flow segments on the basis of said moving object information estimated in said step (m).

7. A moving object detecting method as set forth in claim 6, in which said step (m) has the steps of:
- (m1) accumulatively storing moving object candidate area information obtained in said step (k); and said moving objects detected in said step (l); and
- (m2) comparing said moving object candidate areas apparently moved in said moving picture frame sequence on the basis of said moving object candidate area information accumulatively stored in said step (m1) to track said moving objects detected in said step (l) to estimate moving object information about said moving objects.

8. A moving object detecting method as set forth in claim 6, in which
said moving object information including the number of said moving objects and the amount of apparent motion made by said moving objects.

9. A moving object detecting apparatus for detecting optical flow segments indicative of loci of one or more moving objects apparently moved in a moving picture sequence including a plurality of picture frames each indicating said one or more moving objects at a time point to ensure that said one or more moving objects are correctly detected, said picture frames including a first picture frame indicating said one or more moving objects at a first time point, a second picture frame indicating said one or more moving objects at a second time point, a third picture frame indicating said one or more moving objects at a third time point, and a fourth picture frame indicating said one or more moving objects at a fourth time point in late order, said moving object detecting apparatus comprising:
- a picture inputting section for inputting said moving picture sequence including said first picture frame, said second picture frame, said third picture frame, and said fourth picture frame;
- a picture storage section for storing said moving picture sequence including said first picture frame, said second picture frame, said third picture frame, and said fourth picture frame inputted by said picture inputting section; and an optical flow detecting section for detecting integrated optical flow segments on the basis of said first picture frame inputted by said picture inputting section and said second picture frame, said third picture frame, and said fourth picture frame stored in said picture storage section, whereby said optical flow detecting section includes:

a first optical flow detecting portion for detecting first optical flow segments indicative of loci of said one or more moving objects apparently moved in said moving picture sequence in a time interval starting from said second time point to said first time point on the basis of said first picture frame inputted by said picture inputting section and said second picture frame stored in said picture storage section;

a second optical flow detecting portion for detecting second optical flow segments indicative of loci of said one or more moving objects apparently moved in said moving picture sequence in a time interval starting from said third time point to said first time point on the basis of said first picture frame inputted by said picture inputting section and said third picture frame stored in said picture storage section;

a false optical flow detecting portion for detecting third optical flow segments indicative of loci of said one or more moving objects apparently moved in said moving picture sequence in a time interval starting from said fourth time point to said third time point on the basis of said third picture frame stored in said picture storage section and said fourth picture frame stored in said picture storage section;

an optical flow subtracting portion for subtracting said third optical flow segments detected by said false optical flow detecting portion from said second optical flow segments detected by said second optical flow detecting portion to generate filtered optical flow segments indicative of loci of said one or more moving objects apparently moved in said moving picture sequence in said time interval starting from said third time point to said first time point; and an optical flow adding portion for adding said filtered optical flow segments generated by said optical flow subtracting portion to said first optical flow segments detected by said first optical flow detecting portion to generate integrated optical flow segments indicative of loci of said one or more moving objects apparently moved in said moving picture sequence in said time interval starting from said third time point to said first time point.

10. A moving object detecting apparatus as set forth in claim 9, in which said first optical flow detecting portion includes:

a first picture frame dividing unit for dividing said first picture frame stored by said picture storage section into a plurality of blocks each containing at least one picture element;

a second picture frame dividing unit for dividing said second picture frame stored by said picture storage section into a plurality of blocks each containing at least one picture element;

a comparing unit for sequentially comparing each of said blocks of said second picture frame divided by said second picture frame dividing unit with blocks of said first picture frame divided by said first picture frame dividing unit to select a block of said first picture frame apparently placed in the vicinity of said block of said second picture frame and having the highest degree of similarity with said block of said second picture frame from among said blocks of said first picture frame apparently placed in the vicinity of said block of said second picture frame; and an optical flow detecting unit for detecting optical flow segments each starting from a block of said second picture frame divided by said second picture frame dividing unit to a block of said first picture frame selected by said comparing unit apparently placed in the vicinity of said block of said second picture frame and having the highest degree of similarity with said block of said second picture frame from among said blocks of said first picture frame apparently placed in the vicinity of said block of said second picture frame.

11. A moving object detecting apparatus as set forth in claim 9, further comprising a moving object detecting section for detecting said moving objects on the basis of said integrated optical flow segments detected by said optical flow detecting section whereby said moving object detecting section includes:

a moving object candidate area estimating portion for detecting neighboring areas neighboring to optical flow generating areas in which said integrated optical flow segments are detected by said optical flow detecting section to obtain neighboring area information, and estimating moving object candidate areas in which said moving objects are supposed to be present on the basis of said neighboring area information detected thus detected to obtain moving object candidate area information; and a moving object area estimating portion for estimating moving object areas in which said moving objects are present on the basis of said moving object candidate area information in said moving picture sequence obtained by said moving object candidate area estimating portion to detect said moving objects.

12. A moving object detecting apparatus as set forth in claim 11, in which said moving object candidate area information includes information about the sizes, shapes, positions, picture elements, optical flow information of the moving object candidate areas.

13. A moving object detecting apparatus as set forth in claim 11, further comprising:

a moving object tracking section for tracking said moving objects detected by said moving object area estimating portion on the basis of said moving object candidate area information in said moving picture sequence obtained by said moving object candidate area estimating portion to estimate moving object information including the number of said moving objects and the amount of apparent motion made by said moving objects; and an optical flow detecting controlling section for controlling the time interval between said first time point and said second time point, the time interval between said second time point and said third time point, and the time interval between said third time point and said fourth time point, and the number of said integrated optical flow segments on the basis of said moving object information estimated by said moving object tracking section.

14. A moving object detecting apparatus as set forth in claim 13, which further comprising: a moving object information storing section for accumulatively storing said moving object candidate area information in said moving picture sequence sequentially obtained by said moving object candidate area estimating portion of said moving object detecting section, in which said picture inputting section is operative to sequentially input said moving picture sequence including said first picture frame, said second picture frame, said third picture frame, and said fourth picture frame;

said picture storage section is operative to sequentially store said moving picture sequence including said first picture frame, said second picture frame, said third picture frame, and said fourth picture frame inputted by said picture inputting section;

said optical flow detecting section is operative to sequentially detect integrated optical flow segments on the basis of said first picture frame inputted by said picture inputting section and said second picture frame, said third picture frame, and said fourth picture frame stored in said picture storage section; and said moving object detecting section is operative to sequentially detecting said moving objects on the basis of said integrated optical flow segments detected by said optical flow detecting section; and said moving object tracking section is operative to track said moving objects detected by said moving object detecting section on the basis of said moving object candidate area information in said moving picture sequence accumulatively stored in said moving object information storing section to estimate moving object information including the number of said moving objects and the amount of apparent motion made by said moving objects.

15. A moving object detecting apparatus as set forth in claim 13, in which said moving object tracking section includes:

a moving object information storing portion for accumulatively storing said moving objects detected by said moving object area estimating portion and said moving object candidate area information in said moving picture sequence obtained by said moving object candidate area estimating portion; and a comparing portion for comparing said moving object candidate areas apparently moved in said moving picture frame sequence on the basis of said moving object candidate area information accumulatively stored in said moving object information storing portion to track said moving objects detected by said moving object area estimating portion to estimate moving object information about said moving objects.

16. A moving object detecting apparatus as set forth in claim 13, in which said moving object information including the number of said moving objects and the amount of apparent motion made by said moving objects.

17. A moving object detecting apparatus as set forth in claim 9, further comprising an infrared camera unit for outputting a moving picture sequence of a heat distribution picture sequence including a plurality of picture frames including a first picture frame indicating said one or more moving objects at a first time point, a second picture frame indicating said one or more moving objects at a second time point, a third picture frame indicating said one or more moving objects at a third time point, and a fourth picture frame indicating said one or more moving objects at a fourth time point in late order in which said picture inputting section is replaced with a heat distribution picture inputting section for inputting said first picture frame, said second picture frame, said third frame picture, and said fourth frame picture forming part of said moving picture sequence of a heat distribution picture sequence outputted by said infrared camera unit; and said picture storage section is replaced with a heat distribution picture storage section for storing said first picture frame, said second picture frame, said third frame picture, and said fourth frame picture forming part of said moving picture sequence of a heat distribution picture sequence inputted by said heat distribution picture inputting section.

18. A moving object detecting program product comprising a computer usable storage medium having computer readable code encoded herein for detecting optical flow segments indicative of loci of one or more moving objects apparently moved in a moving picture sequence including a plurality of picture frames each indicating said one or more moving objects at a time point to ensure that said one or more moving objects are correctly detected, said picture frames including a first picture frame indicating said one or more moving objects at a first time point, a second picture frame indicating said one or more moving objects at a second time point, a third picture frame indicating said one or more moving objects at a third time point, and a fourth picture frame indicating said one or more moving objects at a fourth time point in late order, said computer program product comprising:

(a) computer readable program code for inputting said first picture frame;

(b) computer readable program code for inputting said second picture frame;

(c) computer readable program code for inputting said third picture frame;

(d) computer readable program code for inputting said fourth picture frame;

(e) computer readable program code for detecting first optical flow segments indicative of loci of said one or more moving objects apparently moved in said moving picture sequence in a time interval starting from said second time point to said first time point on the basis of said first picture frame inputted by said computer readable program code (a) and said second picture frame inputted by said computer readable program code (b);

(f) computer readable program code for detecting second optical flow segments indicative of loci of said one or more moving objects apparently moved in said moving picture sequence in a time interval starting from said third time point to said first time point on the basis of said first picture frame inputted by said computer readable program code (a) and said third picture frame inputted by said computer readable program code (c);

(g) detecting third optical flow segments indicative of loci of said one or more moving objects apparently moved in said moving picture sequence in a time interval starting from said fourth time point to said third time point on the basis of said third picture frame inputted by said computer readable program code (c) and said fourth picture frame inputted by said computer readable program code (d);

(h) computer readable program code for subtracting said third optical flow segments detected by said computer readable program code (g) from said second optical flow segments detected by said computer readable program code (f) to generate filtered optical flow segments indicative of loci of said one or more moving objects apparently moved in said moving picture sequence in said time interval starting from said third time point to said first time point; and (i) computer readable program code for adding said filtered optical flow segments generated by said computer readable program code (h) to said first optical flow segments detected by said computer readable program code (e) to generate integrated optical flow segments indicative of loci of said one or more moving objects apparently moved in said moving picture sequence in said time interval starting from said third time point to said first time point.

19. A moving object detecting program product as set forth in claim 18, in which each of said picture frame includes a plurality of blocks, and said computer readable program code (e) has:

(e1) computer readable program code for dividing said first picture frame inputted by said computer readable program code (a) into a plurality of blocks each containing at least one picture element;

(e2) computer readable program code for dividing said second picture frame inputted by said computer readable program code (b) into a plurality of blocks each containing at least one picture element;

(e3) computer readable program code for sequentially comparing each of said blocks of said second picture frame divided by said computer readable program code (e2) with blocks of said first picture frame divided by said computer readable program code (e1) to select a block of said first picture frame apparently placed in the vicinity of said block of said second picture frame and having the highest degree of similarity with said block of said second picture frame from among said blocks of said first picture frame apparently placed in the vicinity of said block of said second picture frame; and (e4) computer readable program code for detecting optical flow segments each starting from a block of said second picture frame divided by said computer readable program code (e2) to a block of said first picture frame selected by said computer readable program code (e3) apparently placed in the vicinity of said block of said second picture frame and having the highest degree of similarity with said block of said second picture frame from among said blocks of said first picture frame apparently placed in the vicinity of said block of said second picture frame.

20. A moving object detecting program product as set forth in claim 18, further comprising:

(j) computer readable program code for detecting neighboring areas neighboring to optical flow generating areas in which said integrated optical flow segments are detected by said computer readable program code (i) to obtain neighboring area information;

(k) computer readable program code for estimating moving object candidate areas in said moving picture sequence in which said moving objects are supposed to be present on the basis of said neighboring area information detected by said computer readable program code (j) to obtain moving object candidate area information in said moving picture sequence; and (l) computer readable program code for detecting said moving objects on the basis of said moving object candidate area information obtained by said computer readable program code (k).

21. A moving object detecting program product as set forth in claim 20, in which said moving object candidate area information includes information about the sizes, shapes, positions, picture elements, optical flow information of the moving object candidate areas.

22. A moving object detecting program product for detecting optical flow segments indicative of loci of one or more moving objects apparently moved in a moving picture sequence including a plurality of picture frames each indicating said one or more moving objects at a time point to ensure that said one or more moving objects are correctly detected, said picture frames including a first picture frame indicating said one or more moving objects at a first time point, a second picture frame indicating said one or more moving objects at a second time point, a third picture frame indicating said one or more moving objects at a third time point, and a fourth picture frame indicating said one or more moving objects at a fourth time point in late order, said computer program product comprising:

(a2) computer readable program code for inputting said first picture frame;

(b2) computer readable program code for inputting said second picture frame;

(c2) computer readable program code for inputting said third picture frame;

(d2) computer readable program code for inputting said fourth picture frame;

(a3) computer readable program code for storing said first picture frame;

(b3) computer readable program code for storing said second picture frame;

(c3) computer readable program code for storing said third picture frame;

(d3) computer readable program code for storing said fourth picture frame;

(e1) computer readable program code for detecting first optical flow segments indicative of loci of said one or more moving objects apparently moved in said moving picture sequence in a time interval starting from said second time point to said first time point on the basis of said first picture frame stored by said computer readable program code (a2) and said second picture frame stored by said computer readable program code (b2);

(f) computer readable program code for detecting second optical flow segments indicative of loci of said one or more moving objects apparently moved in said moving picture sequence in a time interval starting from said third time point to said first time point on the basis of said first picture frame stored by said computer readable program code (a2) and said third picture frame stored by said computer readable program code (c2);

(g) computer readable program code for detecting third optical flow segments indicative of loci of said one or more moving objects apparently moved in said moving picture sequence in a time interval starting from said fourth time point to said third time point on the basis of said third picture frame stored by said computer readable program code (c2) and said fourth picture frame stored by said computer readable program code (d2);

(h) computer readable program code for subtracting said third optical flow segments detected by said computer readable program code (g) from said second optical flow segments detected by said computer readable program code (f) to generate filtered optical flow segments indicative of loci of said one or more moving objects apparently moved in said moving picture sequence in said time interval starting from said third time point to said first time point;

(i) computer readable program code for adding said filtered optical flow segments generated by said computer readable program code (h) to said first optical flow segments detected by said computer readable program code (e) to generate integrated optical flow segments indicative of loci of said one or more moving objects apparently moved in said moving picture sequence in said time interval starting from said third time point to said first time point;

(j) computer readable program code for detecting neighboring areas neighboring to optical flow generating areas in which said integrated optical flow segments are detected by said computer readable program code (i) to obtain neighboring area information in said moving picture sequence;

(k) computer readable program code for estimating moving object candidate areas in said moving picture sequence in which said moving objects are supposed to be present on the basis of said neighboring, area information detected by said computer readable program code (j) to obtain moving object candidate area information in said moving picture sequence; and (l) computer readable program code for detecting said moving objects in said moving picture sequence on the basis of said moving object candidate area information obtained by said computer readable program code (k).

23. A moving object detecting program product as set forth in claim 22, further comprising:

(m) computer readable program code for repeating said computer readable program codes (a2) to (l), and tracking said moving objects in said moving picture sequence detected by said computer readable program code (l) on the basis of said moving object candidate area information in said moving picture sequence accumulatively obtained by said computer readable program code (k) to estimate moving object information including the number of said moving objects and the amount of apparent motion made by said moving objects; and (n) computer readable program code for controlling the time interval between said first time point and said second time point, the time interval between said second time point and said third time point, and the time interval between said third time point and said fourth time point, and the number of said integrated optical flow segments on the basis of said moving object information estimated by said computer readable program code (m).

24. A moving object detecting program product as set forth in claim 23, in which said computer readable program code (m) has:

(m1) computer readable program code for accumulatively storing moving object candidate area information obtained by said computer readable program code (k); and said moving objects detected by said computer readable program code (l); and (m2) computer readable program code for comparing said moving object candidate areas apparently moved in said moving picture frame sequence on the basis of said moving object candidate area information accumulatively stored by said computer readable program code (m1) to track said moving objects detected by said computer readable program code (l) to estimate moving object information about said moving objects.

25. A moving object detecting program product as set forth in claim 23, in which said moving object information including the number of said moving objects and the amount of apparent motion made by said moving objects.

* * * * *